(12) United States Patent
Lindsay et al.

(10) Patent No.: US 6,660,362 B1
(45) Date of Patent: Dec. 9, 2003

(54) DEFLECTION MEMBERS FOR TISSUE PRODUCTION

(75) Inventors: Jeffrey Dean Lindsay, Appleton, WI (US); Mark Alan Burazin, Oshkosh, WI (US); Fung-jou Chen, Appleton, WI (US); Michael Alan Hermans, Neenah, WI (US); Philip Sim Lin, Oshkosh, WI (US); Kathryn Sirovatka Padon, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 158 days.

(21) Appl. No.: 09/705,684

(22) Filed: Nov. 3, 2000

(51) Int. Cl.⁷ .................................................. B32B 3/10
(52) U.S. Cl. ...................... 428/131; 428/137; 428/142; 428/196; 442/59; 427/510; 162/902
(58) Field of Search ................................. 428/142, 196, 428/131, 137; 427/468, 510; 162/902; 442/59

(56) References Cited

U.S. PATENT DOCUMENTS

| | | | | |
|---|---|---|---|---|
| 4,528,239 A | * | 7/1985 | Trokhan | 428/131 |
| 6,117,270 A | * | 9/2000 | Trokhan | 162/109 |
| 6,294,485 B1 | * | 9/2001 | Hodson et al. | 139/383 A |
| 6,358,594 B1 | * | 3/2002 | Ampulski | 162/358.4 |
| 6,576,091 B1 | | 6/2003 | Cabell et al. | |

FOREIGN PATENT DOCUMENTS

WO 98/07926 2/1998

OTHER PUBLICATIONS

Boey, F. et al., "Application of microwave curing for the production of structural fiber reinforced composite components using a high pressure autoclave process", *Microwave: Theory an d Application in Materials Processing IV*, pp. 445–452.

Fouassier et al., "The role of the dye/iron arene complex/amine system as a photoinitiator for photopolymerization reactions", *Polymer*, vol. 38, No. 6, pp. 1415–1421, 1997.

Narayanan V., and Scranton, A. B., "Photopolymerization of Composites", *Trends in Polymer Science*, vol. 5, p. 415, 1997.

Padon, K. S. and Scranton, A. B. of Michigan State University, "Recent Advances in Three Component Photoinitiator Systems", *Recent Research Development in Polymer Science*, vol. 3, 1999, pp. 369–385.

*Radiation Curing in Polymer Science and Technology: Fundamentals and Methods*, ed. By J. P. Fouassier and J. F. Rabek, vol. 1, pp. 49–117, 119–125, 193, and 453–501, Elsevier Applied Science, 1993 (ISBN: 1851669337).

*Radiation Curing in Polymer Science and Technology: Photoinitiating Systems*, ed. by J. P. Fouassier and J. F. Rabek, vol. 2, pp. 255–263; 283–285; 323–331; 375–383; 414–416; 435–471; 473; 505; 529; 5555; 575; and 603–604, Elsevier Applied Science, 1993, (ISBN: 1851669337).

Urabe, H. et al., "Influence of polymerization initiator for base monomer on microwave curing of composite resin inlays", *Journal of Oral Rehabilitation*, 1999, 26, pp. 442–446.

\* cited by examiner

*Primary Examiner*—Elizabeth M. Cole
(74) *Attorney, Agent, or Firm*—Pauley Petersen & Erickson

(57) ABSTRACT

Improved deflection members are disclosed for imparting texture to a web through the use of pressing, imprinting, or related technologies, In one embodiment, such deflection members include fabrics having raised elements that contact the web and deflection conduits, wherein the deflection member comprises geometries and/or materials capable of creating asymmetrical domes, either through contact in a compression nip or by imprinting the web onto the Yankee dryer. Deflection members of the present invention can include those with elastomeric components in the raised elements, those comprising asymmetrical geometries in the raised elements, those comprising two or more subsets of raised elements having different material properties or geometries, and other fabrics with novel construction and materials.

74 Claims, 12 Drawing Sheets

DEFLECTION MEMBERS FOR TISSUE PRODUCTION

BACKGROUND OF THE INVENTION

In the art of tissue making, a deflection member may be used to imprint a tissue web against a Yankee dryer or other drying surface. Known deflection members include macroscopically monoplanar fabrics such as a through-drying fabric having a woven substrate and UV-cured resin elements above the substrate. The cured resin elements define deflection conduits into which a moist tissue web can be deflected during a through drying operation to create bulky domes offering softness and absorbency, while the portions of the web residing on the surface of the resin elements are pressed against the dryer surface to create a network of pattern densified areas offering strength.

In the scope of imprinting technology, it is also known to use a press nip for increased deformation of the web into an imprinting fabric, as disclosed by Ampulski et al. in U.S. Pat. No. 5,855,739, "Pressed Paper Web and Method of Making the Same," issued Jan. 5, 1999, and U.S. Pat. No. 5,897,745, "Method of Wet Pressing Tissue Paper," issued Apr. 27, 1999, both of which are herein incorporated by reference in a manner consistent herewith. A related concept is the use of a low permeability flexible film or web placed over a paper web as it resides on an imprinting or molding fabric, wherein the film helps in molding of the paper web when differential air pressure is applied, for it reduces air flow through the web and increases the pressure differential experienced by the web, as disclosed in U.S. Pat. No. 5,893,965, "Method of Making Paper Web Using Flexible Sheet of Material," issued to P. D. Trokhan and V. Vitenberg, Apr. 13, 1999, herein incorporated by reference in a manner consistent herewith. The flexible film or web has the potential to increase water removal from the web as well as increase the degree of molding against a textured fabric. It is likewise said that a compression nip in which moist tissue is pressed between an imprinting fabric and a press felt can cause enhanced deformation and molding of a tissue web. This technology is said to allow a tissue web to be created with multiple zones having different elevations and thicknesses or densities. Also related is U.S. Pat. No. 5,972,813 issued to O. Polat et al. issued Oct. 26, 1999, which discloses an impervious texturing web.

SUMMARY OF THE INVENTION

The technology for producing textured webs as described in the above-referenced Ampulski patents and other related references can be improved through the novel application of deflection members other than the traditional fabrics known for imprinting or through drying technology, yielding a variety of benefits such as but not limited to any one of better molding of the web, enhanced mechanical and absorbency properties, and textures not easily achieved heretofore. In one embodiment, such deflection members include fabrics having raised elements that contact the web and deflection conduits, wherein the deflection member comprises geometries and/or materials capable of creating asymmetrical domes, either through contact in a compression nip or by imprinting the web onto the Yankee dryer. In one embodiment, for example, raised elements and/or deflection conduits in a deflection member, when viewed in cross-sections taken in the machine direction or cross-direction of the fabric, display leading and trailing edges having different angles relative to the vertical axis and desirably at least one side that is curved. In a related embodiment, the walls of a deflection conduit viewed in a cross-sectional profile taken in the machine direction or cross-direction are not both parallel and straight, but may be curved or nonlinear or non-parallel.

A particular cross-section that can be sufficient in demonstrating asymmetry of a raised element or deflection conduit is the machine direction cross-section that passes through the longest span in the machine direction of the structure under scrutiny. For example, with diamond-shaped deflection conduits aligned with the machine direction, the longest span in the machine direction would be a line from one vertex to the opposing vertex. For cylindrical deflection conduits, the longest machine direction span would comprise the diameter of the cylinder. For raised elements in a continuous network, the vertical plane aligned in the machine direction should be sought that passes through the greatest continuous length of the raised element. If the raised elements are discrete polygons or other discrete shapes, the portion of that shape that gives the longest span in the machine direction can be used. Of course, it is possible for a deflection member to be designed to display a symmetrical shape along one particular cross-section while being substantially asymmetrical elsewhere. Thus, while asymmetry along the machine direction cross-section spanning the longest length of the element under scrutiny can be sufficient to establish asymmetry, failure to find asymmetry in that particular profile does not necessarily excise a deflection member from the scope of the present invention. Profiles along other paths may need to be considered as well.

In a related embodiment, isolated structures, which can be either deflection conduits or raised elements, have asymmetrical profiles in the cross direction, even when the geometry in the plan view appears symmetrical. In another related embodiment, the raised elements terminate in top surfaces that are curved, not simply straight and flat.

Deflection members of the present invention can include those with elastomeric components in the raised elements, those comprising asymmetrical geometries in the raised elements, those comprising two or more subsets of raised elements having different material properties or geometries, and other fabrics with novel construction and materials. The application of the deflection members of the present invention can, in some embodiments, further be improved through the addition of shear onto the paper web for better molding against the fabric, or through use of an impervious, flexible film on the side of the paper web not in contact with the deflection member to increase the molding due to air pressure differentials applied across the web. In the latter case, the flexible film may be smooth or comprise a texture, and optionally may comprise apertures to decrease the molding in selected regions or to provide pinholes for producing a selectively apertured tissue web.

As used herein, the term "deflection member" refers to a textured fabric having a web contacting surface comprising raised elements and having deflection conduits, such that the fabric is capable of imparting texture to a web when the web is pressed or urged against the deflection member, particularly when the web is moist (e.g., having a moisture content of 30% or above, more specifically about 60% or above, more specifically still about 70% or above, and most specifically from about 75% to about 90%, with an exemplary range of from about 30% to about 55%). The deflection member can impart texture to a web by serving as:

an imprinting fabric, wherein the fabric presses the web against a solid surface such as a Yankee dryer, to which the web typically remains attached until creped off by a doctor blade;

a textured press fabric, wherein the fabric is pressed against the web in a compressive nip, typically with one or more additional fabrics or deformable belts present in the nip;

a through drying fabric, wherein differential air pressure forces the web to deform against the texture the of fabric;

a transfer fabric, in which the web is transferred to the fabric over a vacuum shoe to cause the web to deform against the fabric, including conditions of differential velocity transfer in which the web travels to the fabric at a higher speed than the fabric; or by serving in any combination of the above roles; or in other embodiments in which a force urges a fibrous web against the fabric under conditions capable of imparting texture to the web.

Deflection members can be formed from a variety of techniques known in the art, including patterned photocuring or radiation curing of polymer resins after application of the resin to a base fabric, laser drilling of a material to form a stand-alone fabric or a layer for a fabric having a reinforcing base fabric, rapid prototyping methods (including selective laser sintering, stereolithography, and room temperature vulcanization molding) with or without a reinforcing base fabric in place, molding, and so forth.

The deflection members of the present invention can be used to produce paper webs and other webs having novel geometrical structures or novel physical properties. For example, webs with asymmetrical domes can offer a variety of advantages such as unique tactile properties. In some embodiments, the dome may be more flexible or deformable for a soft feel. In other embodiments, tissue comprising asymmetrical domes can have bidirectional frictional properties, meaning that the frictional properties along a pathway (e.g., the machine direction or cross-direction) depend on the direction of travel (forwards or backwards along that path). Thus, a tissue may feel smooth when it brushes against the skin in one direction, but offer higher friction for cleaning when the direction is reversed.

DETAILED DESCRIPTION

Figure 1:
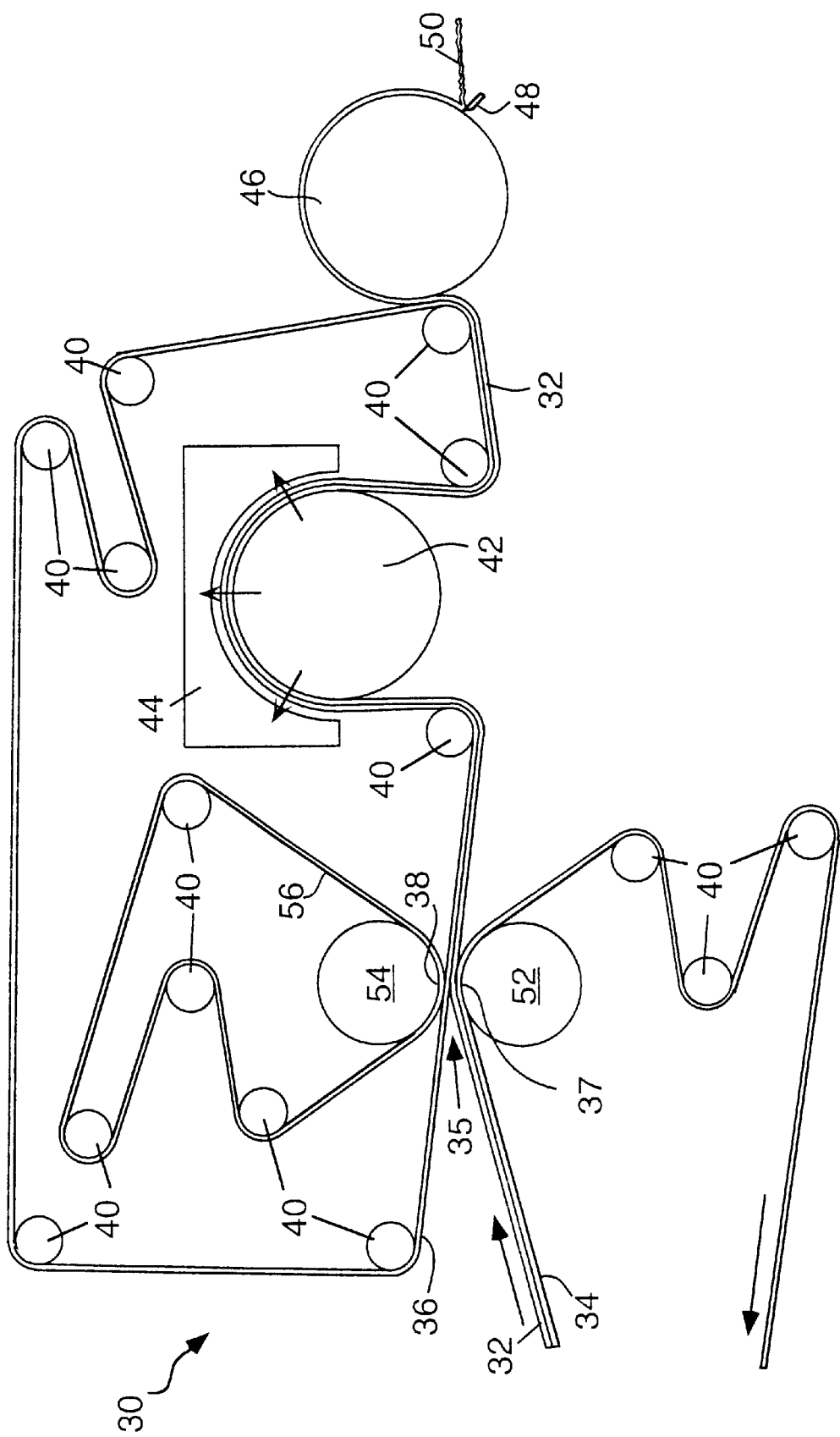
FIG. 1 depicts a papermachine according to the present invention.

FIG. 1 depicts a portion of a paper machine 30 for production of molded, through-dried, and creped tissue 50. A wet paper web 32 produced by a gap former (not shown), crescent former, Fourdrinier, or other formation method known in the art is provided on a deformable carrier fabric 34, which, by way of example, may be a conventional papermaking felt capable of dewatering a moist web in a press nip 35; or may be a felt having a three-dimensional structure for water removal and application of texture, such as the Spectra™ fabrics of Voith Fabrics (Raleigh, N.C., formerly produced by the Scapa Group North America, Shreveport, La), which employ rubbery polyurethane components or other polymer networks in the felt in the form of a porous membrane (see G. Rodden, "Nonwovens and Laminates Make their Way into Press Felts," *Pulp and Paper Canada*, vol. 101, no. 3, pp. 19–23, March 2000); or may be the nonwoven molding substrates of Lindsay and Burazin in U.S. Pat. No. 6,080,691, "Process for Producing High-Bulk Tissue Webs Using Nonwoven Substrates," issued Jun. 27, 2000, herein incorporated by reference; or may be the marking felts of Voith Fabrics (Raleigh, N.C., formerly of Scapa Group Ltd. of England) disclosed by P. Sudre, "Papermakers Marking Felt," European Patent Application 0 672 784-A1, published Sep. 20, 1995; or can be the drilled nonwoven webs of Hans Albert disclosed in U.S. Pat. No. 4,541,895, issued Sep. 17, 1985, herein incorporated by reference, and the like. In one embodiment, the deformable carrier fabric 34 is an apertured polymeric press fabric comprising a woven textile base, an apertured polymeric layer, and batt fibers, such as the fabrics described by J. Hawes, "Apertured Structures: A New Class of Porous Polymeric Press Fabrics," *Pulp and Paper Canada*, Vol. 100, No. 2, December 1999, pp. T375–377, with specific examples manufactured by Albany International Corp., Albany, N.Y. In related embodiments, the woven textile base in the deformable carrier fabric 34 can be replaced with a nonwoven spiral fabric, which is formed by assembly of monofilament helical coils joined by pintles. Spiral fabrics are described by M. Di Ruscio in "Spiral Fabrics as Dryer Fabrics," PaperAge, January. 2000, pp. 20–23, and are available from Albany Corp. (Albany, N.Y.).

Prior to being disposed on the deformable carrier fabric 34 or while thereon, the web 32 may be dewatered by any means known in the art, including foils, vacuum boxes, capillary dewatering devices, infrared or microwave drying, pneumatic dewatering, including displacement dewatering devices as described by J.D. Lindsay, "Displacement Dewatering To Maintain Bulk," Paperi Ja Puu, vol. 74, No. 3, 1992, pp. 232–242, and the air press disclosed in WO 99/23296 by D. V. Lange, published May 14, 1999, or in U.S. Pat. Nos. 6,080,279, issued Jun. 27, 2000 to Hada et al.; 6,083,346, issued Jul. 4, 2000 to Hermans et al.; U.S. Pat. No. 6,096,169, issued Aug. 1, 2000 to Hermans et al.; and U.S. Pat. No. 6,093,284, issued Jul. 25, 2000 to Hada et al., all of which are herein incorporated by reference; and the like.

As the web 32 is carried by the underlying deformable carrier fabric 34, it passes though the press nip 35 between two opposing press surfaces 37, 38 capable of applying suitable pressure to partially dewater the moist web 32. The web 32 contacts a deflection member 36 in the nip 35. The deflection member 36 can be a substantially macroplanar fabric having deflection conduits and elevated regions, and can be correspond to any of the fabrics disclosed in U.S. Pat. No. 5,679,222, issued Oct. 21, 1997 to Rasch et al.; U.S. Pat. No. 4,514,345, issued Apr. 30,1985 to Johnson et al.; U.S. Pat. No. 5,334,289, issued Aug. 2, 1994 to Trokhan et al.; U.S. Pat. No. 4,528,239, issued Jul. 9,1985 to Trokhan; and U.S. Pat. No. 4,637,859, issued Jan. 20, 1987 to Trokhan, all of which are herein incorporated by reference.

The nip 35 can have a machine direction length of at least about 2 inches, more specifically 3 inches, and most specifically from about 4 inches to about 15 inches, and can comprise opposed convex and concave compression surfaces. Here the opposing press surfaces 37, 38 are depicted as simple press rolls 52, 54, though press surfaces 37, 38 could be provided by a variety of devices known in the art, including long nip presses with hydraulic shoes, such as the high intensity nips disclosed by M.A. Hermans et al. in WO 97/43483, published Nov. 20, 1997, the shoe nips disclosed in U.S. Pat. No. 5,897,745, issued Apr. 27, 1999 to Ampulski et al., herein incorporated by reference, or the nips disclosed in U.S. Pat. No. 5,650,049, issued Jul. 22, 1997 to Kivimaa et al., U.S. Pat. No. 5,662,777, issued Sep. 2, 1997 to Schiel et al., or Patent Application WO 95/16821, published Jun. 21, 1995 in the name of C. J. Mentele; crown compensated rolls with internal hydraulics for controlling applied pressure; one or more soft rolls with deformable covers; a hard roll in opposition to a suction roll in which vacuum dewatering occurs through drilled holes in the suction roll's surface; and opposing steel bands urged together by applied pressure behind at least one band, such as the CONDE-BELT™ drying system of Valmet Corp. (Finland). Condebelt™ technology is disclosed in U.S. Pat. No. 4,112,586 issued Sep. 12,1978; U.S. Pat. Nos. 4,506,456 and 4,506,457 both issued Mar. 26, 1985; U.S. Pat. No. 4,899,461 issued Feb. 13,1990; U.S. Pat. No. 4,932,139 issued Jun. 12, 1990; and U.S. Pat. No. 5,594,997 issued Jan. 21, 1997, all foregoing patents issued to Lehtinen; U.S. Pat. No. 4,622,758 issued Nov. 18, 1986 to Lehtinen et al.; and U.S. Pat. No. 4,958,444 issued Sep. 25, 1990 to Rautakorpi et al., all of which are herein incorporated by reference.

Shoe presses or long nip presses can modify the performance of pressing systems by providing prolonged, controlled pressure pulses for good sheet molding at lower peak pressures. Commercially available examples of such presses include the ENP (Extended Nip Press) of Beloit Corp. (Beloit, Wis.), such as the ENP-C which can operate as a single-felted or double-felted press, or the Tandem NipcoFlex press of Voith (Appleton, Wis.), and the OptiPress of Valmet Corp. (Helsinki, Finland). Deformable felts and belts are also helpful in molding a web 32 and dewatering the web 32 against the deflection member 36 in an extended nip press, such as a press having a shoe that provides compression times of over 5 ms and more specifically over 15 ms, with peak loads that can be less than 1500 psi, more specifically less than 800 psi and more specifically still less than 500 psi.

In the press nip 35, a first surface of the paper web 32 resides on the deformable carrier fabric 34, and the opposing surface contacts an deflection member 36 which can be further supported by a deformable backing fabric 56. The deformable backing fabric 56 can be a conventional papermaking felt or any of the other deformable fabrics disclosed herein suitable for use as the deformable carrier fabric 34. However, in one embodiment, no deformable backing fabric 56 is used, and in a related embodiment, the deflection member 36 has deformable properties such as sponge-like elements or elastomeric support elements that at least partially eliminate the motivation to employ a deformable backing fabric 56 in order to get good press performance and web molding in the nip 35.

The deformable carrier fabric 34, the deformable backing fabric 56 and the deflection member 36 are all guided and controlled in their motion by a series of rolls 40 known in the papermaking arts.

In one embodiment, a degree of shear is imposed on the web 32 as it contacts and is transferred to the deflection member 36. Shear can be provided by several means, such as differential velocity between the two deformable fabrics 34, 56; or by using of a soft, deformable roll cover on one or more rolls 52, 54 in the nip 35 such that deformation of the roll surface(s) 37 and/or 38 causes in-plane (machine direction) shear of the web (e.g., momentary deceleration coming into the nip and momentary acceleration after the midpoint of the nip); or by in-plane flexure of the deflection member 36 as it is compressed, such that the distance between any two points in the machine direction of the web is not rigidly fixed as the deflection member 36 is compressed, but that there is a degree of local in-plane deformation in the machine direction in response to z-direction mechanical pressure by the nip 35; or the like. Alternatively, the shear can be due to nonuniform deformation of the deflection member 36 in the nip 35, as described in more detail below.

In one embodiment for creating shear, differential velocity exists in the press nip 35. In this embodiment, the deformable carrier fabric 34 and the wet web 32 move at a first velocity, while the deflection member 36 and the deformable backing fabric 56 move at a second velocity. The first velocity can be substantially the same as the second velocity, but in one embodiment a difference exists of from about 1% or more, such as from about 2% to 40%, or from about 3% to 30%, or about 5% or more. When the second velocity is less than the first velocity, a phenomenon known as rush transfer occurs, in which the web 32 is foreshortened as the faster moving deformable carrier fabric 34 rushes the web 32 against the slower moving deflection member 36, which can improved the degree of molding provided by the deflection member 36 and can increase the machine direction stretch of the web 32. For rush transfer to be effective, conditions in the nip 35 must be optimized to cause good transfer of the web 32, good foreshortening, and little damage to the web 32. Pressures in the nip 35 may need to be reduced or optimized to prevent damage to the web 32 and the fabrics 34, 56 or deflection member 36. For example, nip pressure may be set to less than 1000 pounds per linear inch (pli), or less than 600 pli, or from about 50 to 500 pli, or to less than 200 pli. A steam shower (not shown) can also be installed before the nip 35 to soften the web and improve both water removal and deformability for good molding.

A variety of effects can be achieved with differential velocity between the web 32 and a deformable surface contacting the web 32 (or a flexible but incompressible material backed with a deformable material, permitting deformation during compression). For example, momentary contact with a press felt 34, 56 in a nip 35 moving at a different velocity than the web 32 itself can cause added deformation of the web 32, wherein fibers on the macroplanar surface of the deflection member 36 tend to be moved in one direction while the fibers in the deflection conduits 62 are fixed. The result can be shear thinning of some regions and shear thickening of others. For example, the region between two nearby deflection conduits 62 spaced apart in the machine direction will be thickened near one conduit and thinned near the other. Alternatively, some regions on the macroplanar surface will be densified relative to others due to the shearing effect of differential velocity contact. The resulting web 32 can have 1) a first relatively high density region having a periodic variation in the machine of thickness and/or density and having a first range of elevation, 2) a second relatively low density region having a second thickness, which is a local maximum generally corresponding to the central regions of domes formed in the deflection conduits, and 3) a third region extending intermediate the first and second regions having a third thickness, which is a local minimum generally corresponding to the sides or bases of the domes formed in the deflection conduits 62.

As the web 32 is pressed against the deflection member 36, water will generally be expelled and either pass through the deflection member 36 into the deformable backing fabric 56 or pass into the deformable carrier fabric 34 or both, depending on the permeability of the deflection member 36 and the permeability and moisture content of the deformable fabrics 34, 36, and the presence of suction, drilled holes or grooves in one or more of the opposing press surfaces 37, 38, and other conditions of the nip 35. In one embodiment, the deflection member 36 has deflection conduits in fluid communication with the deformable backing fabric 56 such that water can pass from the web 32 in the nip toward the deformable backing fabric 56. In another embodiment, the deflection member 36 is substantially impervious, with water removal directed primarily toward the deformable carrier fabric 34.

After transfer to the deflection member 36, the web 32 can be further molded against the deflection member 36 by one or more of:

through drying with differential air pressure pressing the web 32 against the deflection member 36, as in the through dryer 42 shown in FIG. 1;

dewatering and deforming the web with an air press, such as that disclosed in WO 99/23296 by D. V. Lange, published May 14, 1999, herein incorporated by reference;

using the deflection member 36 to press the web 32 against a solid surface such as a drum dryer or Yankee cylinder 46 also shown in FIG. 1, from which a dried web 50 may then be creped with a crepe blade 48, as shown in FIG. 1, or removed without creping (not shown), with methods such as those disclosed in commonly owned U.S. aplication Ser. No. 09/961773, "Method of Producing Low Density Resilient Webs," filed Oct. 31, 1997; and the like.

Principles of molding a web 32 on a drum dryer or Yankee dryer 46 without creping are disclosed by F. Druecke et al. in commonly owned U.S. aplication Ser. No. 09/961773, "Method of Producing Low Density Resilient Webs," filed Oct. 31, 1997, herein incorporated by reference, which discloses combinations of adhesive and release agent which can permit the web 32 to adhere to the drum dryer or Yankee 46 for effective heat transfer but also can permit the dried web 50 to be pulled off the dryer 46 without the need for creping. Other relevant teachings are found in commonly owned U.S. aplication Ser. No. 09/961913, filed Oct. 31, 1997, by S. L. Chen et al. (see also WO 99/23299 and WO 99/23298, both of which were published May 14, 1999);

U.S. Pat. No. 6,080,279, issued Jun. 27, 2000 to Hada et al.; U.S. Pat. No. 6,083,346, issued Jul. 4, 2000 to Hermans et al.; U.S. Pat. No. 6,096,169, issued Aug. 1, 2000 to Hermans et al.; U.S. Pat. No. 6,093,284, issued Jul. 25, 2000 to Hada et al., and in U.S. Pat. No. 5,336,373, issued Aug. 9, 1994 to Scattolino et al., all of which are herein incorporated by reference.

The dryer drum 46 need not be a steam-filled roll but may be any heated drying surface known in the art, such as an internally heated gas-fired roll (ABB Flakt's Gas Heated Paper Dryer), an inductively heated drying roll, an impulse drying roll such as those disclosed in U.S. Pat. No. 5,353,521, issued Oct. 11, 1994 to Orloff; and U.S. Pat. No. 5,598,642, issued Feb. 4, 1997 to Orloff et al., other drying technologies described by Rhiannon James in "Squeezing More out of Pressing and Drying," *Pulp and Paper Intemational*, Vol. 41, No. 12 (December 1999), pp. 13–17, and the like.

Many other embodiments are within the scope of the present invention. For example, an additional foraminous backing member (not shown) can be disposed between one of the deformable fabrics 34, 56 and the respective pressing surface 37, 38 to provide additional void volume for receiving water when one or more of the compressed deformable fabrics 34, 56 in the nip 35 is near its saturation point. The foraminous backing member (not shown) can be an additional endless web that can have a void volume capable of receiving about 100 grams or more of water per square meter or about 200 grams per square meter, or between about 300 and about 600 grams per square meter. The foraminous backing member can also have a compressibility of less than about 50 percent so that the void volume of the foraminous backing member remains open while the foraminous backing member is passing through the nip. The foraminous backing member can be formed from woven filaments or can be a spiral fabric, and can be in the form a continuous belt. In another embodiment, the foraminous backing member can comprise a patterned resin layer. In one embodiment, the foraminous backing member comprises a patterned resin layer joined to a dewatering felt layer. For instance, the patterned resin layer can be joined to the deformable carrier fabric 34.

In another embodiment, a plurality of texture-generating surfaces are present in the nip 35, such that there is an interaction between the texture of the deflection member 36 and the texture of other surfaces. For example, the other texture-generating surfaces can be one or more of the deformable fabrics 34, 56, and/or one or both of the press surfaces 37, 38. Thus, there is an interaction between the plurality of texture-generating surfaces in the nip 35 which in turn provide a texture to the web 32 that would not be achieved by the use of a single deflection member 36 as the sole texture-generating surface.

In another embodiment, before, during, or after the pressing invention, the paper web 32 may also be contacted with a flexible web (not shown) having an air permeability less than the air permeability of the underlying fabric 34 or deflection member 36 on which the paper web is disposed. The paper web 32 is overlaid with the flexible web and exposed to an air pressure gradient such that the flexible web deflects toward the underlying fabric 34 or deflection member 36 and further promotes at least one of water removal from the paper web and molding of the paper web. The flexible web can have a degree of surface texture which can be imparted to the upper surface of the paper web during pressing or application of air pressure differentials. Principles for the use of a flexible sheet against a paper surface on a papermaking belt are disclosed by P. D. Trokhan and V. Vitenberg, U.S. Pat. No. 5,893,965, issued Apr. 13, 1999, previously incorporated by reference.

In an alternative embodiment (not shown) to that of FIG. 1, the web 32 can reside on the deflection member 36 as it approaches the nip 35, rather than residing on the deformable carrier fabric 34. In such an alternative embodiment, the web 32 would generally remain on the deflection member 36 as it passes though the nip 35, rather than being transferred from one fabric to another in the proximity of the nip 35, though a transfer could be established, if desired, followed by another transfer to the deflection member 36 or to another textured fabric for further molding or drying. The embodiment depicted in FIG. 1 permits a differential velocity transfer to occur from the deformable carrier fabric 34 to the deflection member 36, which would not be possible if the web is on the deflection member 36 before the nip 35 and remains thereon until well after the nip 35.

To assist in removal of the web 32 from the deflection member 36 when the web 32 is pressed against the drying drum 46, the deflection member 36 can be sprayed or coated with release agents prior to contact with the web 32. Such release agents can include fluoropolymers, silicone compounds, or oil-water emulsions, and specifically can include an emulsion comprising about 90 percent by weight water, about 8 percent petroleum oil, about 1 percent cetyl alcohol, and about 1 percent of a surfactant such as Adogen TA-100.

Figure 2:
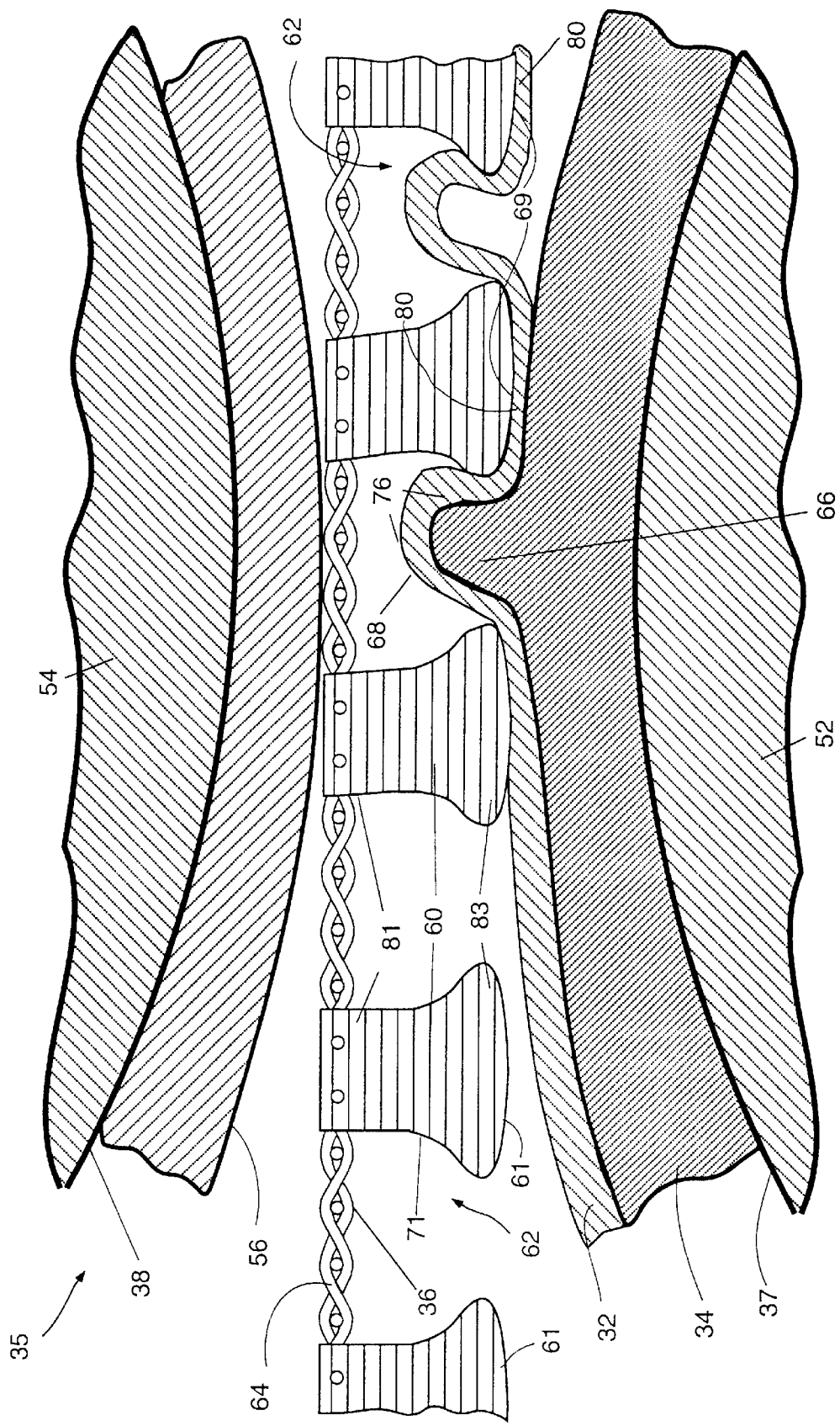
FIG. 2 depicts a press nip in which a web of moist tissue is transferred from a carrier fabric to a deflection member.

FIG. 2 is a schematic of a compression nip 35 showing a deflection member 36 according to the present invention and further depicting the deformation in the web 32 and deformable carrier fabric 34 that can occur in the nip 35 against the deflection member 36. The deflection member 36 comprises at least one pattern of raised elements 60 forming a web densifying surface 61 (in the sense that a web would be selectively densified by the web densifying surface 61 if pressed against the raised elements 60) and defining a pattern of deflection conduits 62 therebetween. The web densifying surface 61 occupies a fraction of the entire web contacting surface of the deflection member 36.

The raised elements 60 as depicted have nonlinear, curved sides 71, in contrast to the linear, straight sides typical of prior imprinting fabrics. When viewed in a cross-direction (CD) profile or a machine direction (MD) profile, one or both sides of the raised elements 60 can be nonlinear in the deflection members 36 of the present invention. Sides of the raised elements 60 in the present invention can also comprise two or more linear segments having different slopes, such that at least one side of the raised element 60 is not a single straight line.

The web 32 can deform under pressure into the deflection 62 conduits and water can pass therethrough to the deformable backing fabric 56 if the deflection member 36 is sufficiently permeable and if the hydraulic driving force for water transport is sufficient. The raised elements 60 have a base 81 which is attached to a base fabric 64 (a foraminous element), and have an upper portion 83, which is wider than the base portion 81, depicted as a mushroom shape in the embodiment of FIG. 2. The raised elements 60 are also depicted as being adequately deformable to deform during compression, and to be skewed in the machine direction when the deformable carrier fabric 34 is moving faster than the deflection member 36. The skewing of the resilient raised elements 60 in a nip with rush transfer further contributes to the asymmetry of the protrusions 68 formed in the paper web 32.

As shown in FIG. 2, the deformable carrier fabric 34 can deflect into the deflection conduits 62 to form a local mound 66 of the deformable carrier fabric 34 and also a protrusion 68 in the web 32. The protrusion 68 of this embodiment is generally asymmetrical when viewed along a machine-direction cross-section as in FIG. 2. Without wishing to be bound by theory, the asymmetry of the protrusion 68 can be caused or enhanced by differential velocity transfer, in which the higher speed of the deformable carrier fabric 34 rushes some of the paper web toward the raised elements 60 of the deflection member 36, causing fibers to accumulate toward the trailing side of the raised elements 60. The shape of the raised elements 60 and their deformation in the compression nip 35 can also contribute to asymmetry of the protrusions 68 of the web 32, even when no differential velocity is present in the nip, if the element is asymmetrical and/or if the raised elements 60 become asymmetrical during compression due to a heterogeneous structure comprising two or more materials having different physical properties, and/or if the raised elements 60 comprise an elastomeric material permitting temporary distortion of the raised elements 60 in the direction of shear within in the compressive nip, which is also depicted in FIG. 2.

The molded web 32 will tend to have a pattern of protrusions 68 having a first relatively high density region 80 where the web has been pressed with the raised elements 60, and a relatively low density region 76 generally corresponding with the protrusions 68, with an intermediate region therebetween.

Though the simple base fabric 64 shown in FIG. 2 is relatively flat, three-dimensional base fabrics can be used, including both woven and nonwoven structures, and double layer and triple layer fabrics, including those with ovate or flat yarns, such as the fabrics disclosed in U.S. Pat. No. U.S. Pat. No. 5,379,808, issued Jan. 10, 1995 to Chiu. Examples of three-dimensional woven base fabrics include the sculpted fabrics disclosed in U.S. Pat. No. 5,429,686, issued Jul. 4,1995 to Chiu et al., herein incorporated by reference. The sculpted fabrics disclosed therein (not shown) have strands that rise above the plane of the fabric to create an enhanced three-dimensional structure. For purposes of the present invention, such fabrics could be modified by adding resin to form a deflection member having raised elements formed from the resin in a repeating pattern, superposed on the existing three-dimensional woven structure, such that the added raised elements are suitable for densifying the portions of a paper web in contact with the resin in an imprinting operation or a wet pressing event or other operation in which the web is pressed against the deflection member. Thus, the web would receive a primary texture due to the presence of raised elements in a repeating pattern and a secondary texture imparted to the web in the deflection conduits by the three-dimensional woven structure of the base fabric.

In a related embodiment that is not shown, the woven base fabric 64 of the deflection member 36 can be replaced with a nonwoven spiral fabric or other suitable nonwoven, foraminous structures, including the nonwoven apertured fabrics of Albert in U.S. Pat. No. 4,541,895, issued Sep. 17, 1985, previously incorporated by reference.

In some cases, there may be some difficulty in removing a molded web 32 from the deflection member 36 when the web 32 becomes deeply molded into a deflection member 36 with mushroom-shaped raised elements 60 or other raised elements 60 having a cross-sectional shape with a top portion 83 wider than the base portion 81. This difficulty can be overcome by bending the deflection member 36 away from the paper contacting side thereof such that the distance between adjacent raised elements 60 widens, and then removing the web 32. Passing the deflection member 32 over a narrow turning bar (e.g., diameter less than 12 inches, more specifically less than about 8 inches) can be a helpful tool.

Figure 3A:
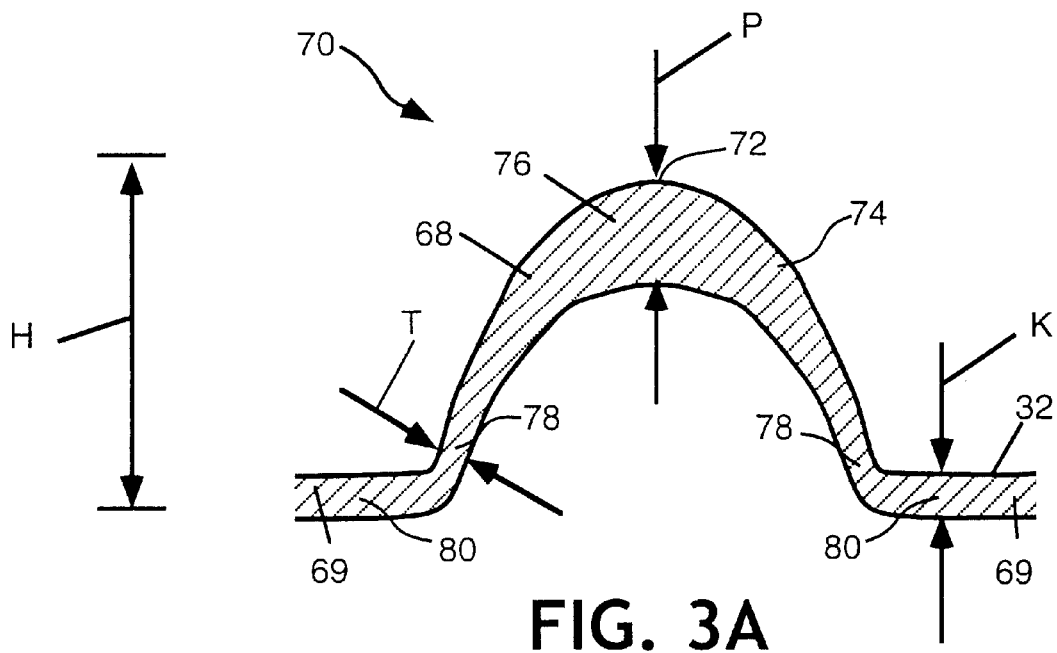
FIGS. 3A and 3B depict profiles of imprinted domes that can be generated according to the present invention.
Figure 3B:
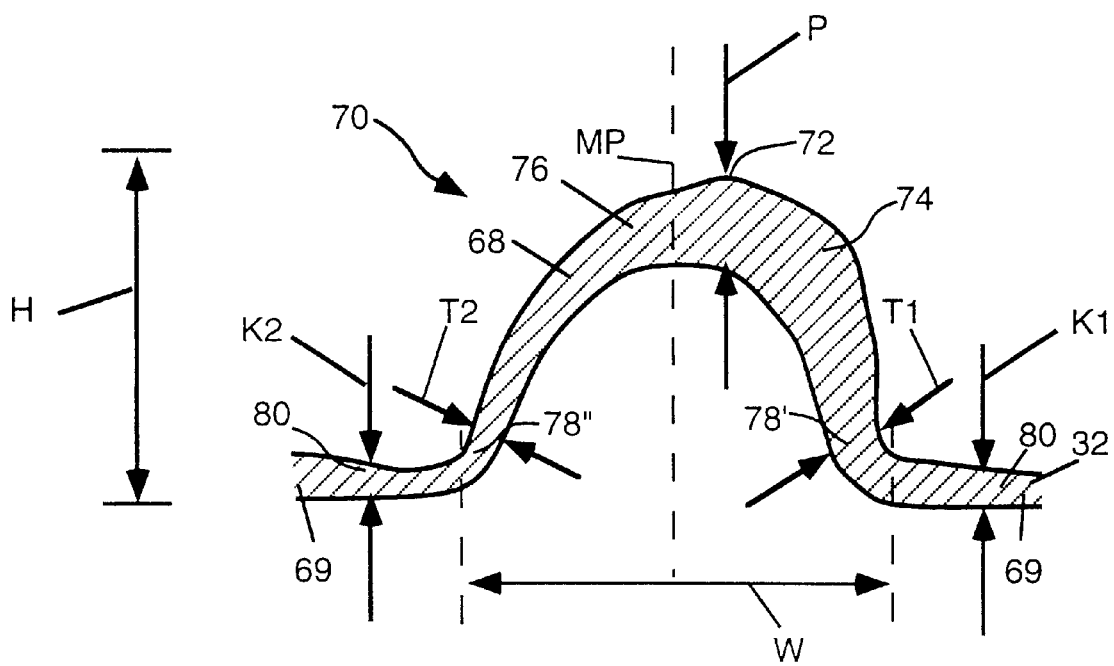

FIGS. 3A and 3B depict schematic examples of two profiles 70 in the web 32 achievable by the present invention. The profile 70 of FIG. 3A is drawn substantially according to FIG. 8 of Ampulski et al. in U.S. Pat. No. 5,904,811, issued May. 18, 1999, herein incorporated by reference. In FIGS. 3A and 3B, each profile 70 represents a two-dimensional unit cell extending from the midpoints 69 of the web 32 above the center of the raised elements 60 of the deflection member 36. Each profile 70 has a point of maximum height, the local maximum 72 on the dome 74, and generally has a local minimum that can correspond with the midpoints 69 of the portion of the web 32 above the center of the raised elements 60 during pressing. In FIG. 3A, the profile 70 is substantially symmetrical about the local maximum 72, representing either a textured web 32 made according to U.S. Pat. No. 5,904,811 of Ampulski or according to some embodiments of the present invention with substantially no shear during pressing against the deflection member 36. The molded web 32 has a relatively low density zone 76 around the local maximum with a local thickness P, a high density zone 80 with a relatively lower local thickness K, and an intermediate zone 78 with an intermediate local thickness T. If substantial shear is applied, say, by differential velocity transfer, the relative motion of the deflection member 36 versus the web 32 results in a "snowplow" effect in which moist fibers are sheared and piled up toward one side of the profile 70, resulting in an asymmetrical profile 70 such as that shown in FIG. 3B. The profile 70 of FIG. 3B has a local maximum 72 with a local thickness P and a relatively low density zone 76, and two transition zones 78', 78" at the base of the dome 74 with local thicknesses T1 and T2, respectively. The shearing of the fibers may also result in nonuniform thickness in the high density zone 80 near the midpoints 69, such that measurement of the thickness halfway from each side of the base of the dome 74 and the midpoints 69 can yield a first local thickness K1 and a second local thickness K2 which need not be the same due to the asymmetry caused by shearing. Further, the local maximum 72 need not be along the midpoint line MP (the vertical line which passes through the center of the base below the dome 74, being equidistant from the inner surfaces of the dome 74 at the base of the dome 74), but may be horizontally displaced from the midpoint line MP by a fraction of the width of the dome 74, such as about 6% or more, or about 10% or more, about 15% or more, or from about 10% to about 25% of the width W of the dome 74 measured as the maximum horizontal distance between the outer surfaces at the base of the dome 74. Thus, displacement of the local maximum 72 from the midpoint line MP is evidence of symmetry in the shape of the dome 74 and in the profile 70 more generally. The profile 70 can also be taken as asymmetrical when the transition ratio, T1:T2 or T2:T1, hichever gives a value of 1 or more, is about 1.2 or greater, more specifically about 1.3or greater, more specifically still from about 1.3 to about 3.0, most specifically about 1.5 or greater, with an exemplary range of from about 1.5 to about 3.5. Another measure of asymmetry is the high density ratio, defined as K1:K2 or K2:K1, whichever gives a value of 1 or more, which, for asymmetrical profiles can be 1.1 or greater, more specifically about 1.3 or greater, and more specifically about 1.5 or greater, with an exemplary range of from about 1.4 to about 2.0. Alternatively, the cross-sectional profile 70 of a unit cell can be divided by the midpoint line MP and the total area of the two sides compared using standard image analysis methods. When the area ratio, which is the ratio of the first area (being greater than that of the second area) to the second area, is about 1.2 or greater, such as from about 1.3 to about 2.5, the profile can be taken as asymmetrical. Of course, an asymmetrical profile can have two or more of the above measures (displacement of the local maximum 72 from the midpoint line, the transition ratio, the high density ratio, and the area ratio) giving values within the stated ranges for asymmetry. It is recognized that any one dome 74 may have aberrations in shape or size, so tests for symmetry should be based on a statistical average of 100 randomly selected domes, with profiles taken in a consistent direction and passing through the center of the dome 74, when applicable. The webs 32 of the present invention can have about 40% or greater of the domes 74 exhibiting asymmetry in a cross-sectional profile such as a machine direction profile or cross-direction profile; more specifically about 50% or greater of the domes 74 exhibiting asymmetry in terms of at least one of the measures discussed above and optionally in terms of two or more of the measures discussed above; more specifically still about 60% or greater of the domes 74 exhibiting asymmetry; and most specifically about 80% or greater of the domes 74 exhibiting asymmetry. In one embodiment, substantially all of the domes will have one or more measure of asymmetry indicating an asymmetrical structure. Asymmetry of the domes 74 for webs 32 of the present invention will generally be present prior to creping and will frequently persist after creping as well, for webs that are creped.

Even though the profile 70 of FIG. 3B has two local thicknesses K1 and K2 depicted in the high density region, a single local thickness K can be ascribed to the region which is the average of K1 and K2, which also can be used to define an average density there. Likewise, a single transition local thickness T can be reported as the average of T1 and T2.

The molded web 32 formed by the process shown in FIG. 1 can have relatively high tensile strength and flexibility for a given level of web basis weight and web caliper H (FIGS. 3A and 3B). This relatively high tensile strength and flexibility is believed to be due, at least in part, to the difference in density between the relatively high density region 80 and the relatively low density region 76. Web strength is enhanced by pressing a portion of the intermediate web 36 between the deformable carrier fabric 34 and the deflection member 36 to form the relatively high density region 80. Simultaneously compacting and dewatering a portion of the web provides fiber to fiber bonds in the relatively high density region 80 for carrying loads. Pressing also can help form the transition region 78, which can provide web flexibility. The relatively low density region 76 deflected into the deflection conduit portions of the deflection member 36 provides bulk for enhancing absorbency. In addition, pressing the web 36 draws papermaking fibers into the deflection conduits to form the intermediate density region 78, thereby increasing the web macro-caliper H (FIGS. 3A and 3B). Increased web caliper H decreases the web's apparent density (web basis weight divided by web caliper H). Web flexibility increases as web stiffness decreases.

The total tensile strength of the web made according to the present invention can be at least about 300 meters. Paper webs made according to the present invention can have a macro-caliper H of at least about 0.10 mm. In one embodiment, paper webs made according to the present invention have a macro-caliper of at least about 0.20 mm, and more specifically at least about 0.30 mm. The procedure for measuring the macro-caliper H are described below.

The paper web made according to the present invention can have densified "knuckles" occupying from about 8% to about 60% of the surface area of the web, wherein the densified knuckle regions have a relative density of at least 125% of the density of the high bulk region of the web.

Figure 4:
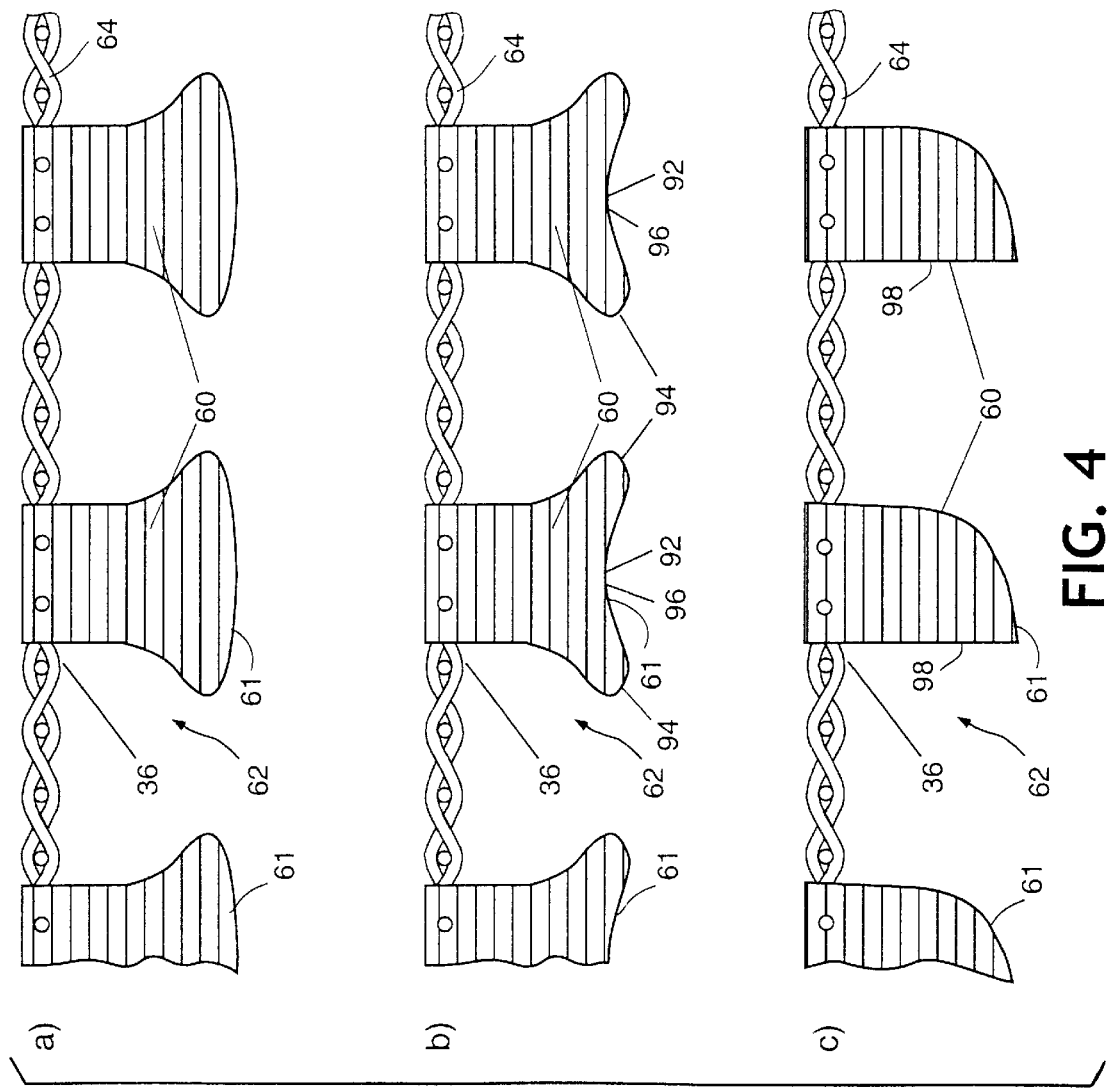
FIGS. 4A–4C depict embodiments of the deflection member having variable thickness in the raised elements from the base to the top of the element.

FIGS. 4A–4C depict additional embodiments of the deflection member 36. FIG. 4A depicts the machine direction cross-section of a deflection member 36 wherein the raised elements 60 have a mushroom shape, as in FIG. 2. FIG. 4B depicts elements similar to those of FIG. 4A, except the central portion of the raised elements 60 comprises an indentation 92, yielding a raised element 60 with an elevation (relative to the base fabric 64) at the upper periphery 94 being greater than the elevation at the upper central portion 96 of the raised element 60. FIG. 4C depicts asymmetrical raised elements 60 having a height maximum at or near a first side 98 of the raised elements 60. The first side 98 corresponding to or closest to the height maximum can be a trailing edge or leading edge of the raised elements 60. When an indentation 92 is present in the raised elements 60, it can have a depth relative to the thickness of the raised element (from the backside to the top side of the raised element 60) of about 40% or less, more specifically about 25% or less, most specifically about 15% or less, with exemplary ranges of from 5% to about 20%, or from about 10% to about 40%.

Numerous other shapes can be depicted having either a top portion wider than the base portion of the raised elements 60, and being either symmetrical or asymmetrical, and having a web densifying surface 61 that can be convex (as FIG. 4A), concave, or both convex and concave, such as a saddle-shape profile (as FIG. 4B). The web densifying surface 61 can be curved or linear, with linear surfaces being either horizontal or positively or negatively sloped in the machine direction or in the cross-direction.

Asymmetrical raised elements 60 such as those of FIG. 4C can be especially helpful in creating asymmetrical shaped protrusions in the paper web, with or without differential velocity transfer of the paper web to the deflection member 36.

FIGS. 5A–5H depict raised elements 60 comprising two discrete zones of different materials that differ in mechanical or elastic properties to further enhance the asymmetry or other properties of the protrusions created by pressing the deflection member 36 against a paper web (not shown). FIG. 5A depicts a simple symmetrical raised element 60 having a first material 100 and a second material 102 separated by a vertical interface 104. In one embodiment, the first material 102 differs substantially from the second material 104 in material properties such as elastic modulus, Poisson ratio, or storage modulus, such that in a press nip, the raised element 60 will not form a symmetrical structure during compression but will be asymmetrical, such as a skewed structure or one that bulges more in one direction (e.g., the forward or reverse machine directions). Alternatively or simultaneously, the two material zones 100, 102 optionally coupled with an asymmetrical shape of the raised elements 60 yield a web that is densified more in the portions contacting one of the two materials 100, 102 than in the portions contacting the other of the two materials 100, 102.

FIG. 5B depicts a layered raised element 60 wherein the interface 104 dividing the first material 100 from the second material 102 is substantially horizontal. The interface 104 in FIG. 5C is at an angle relative to the horizon (for a base fabric 64 lying in the horizontal plane), such as from about 20 to 70 degrees, with about 45 degrees being depicted. FIG. 5D shows that the interface 104 can be defined by more than one line, ere having both horizontal and vertical components. FIGS. 5E to 5H show that other shapes can be employed. FIG. 5E depicts a mushroom-shaped raised element 60 having an interface 104 with a minimum elevation relative to the base fabric near the center of the raised element 60. FIG. 5F depicts another mushroom-shaped raised element 60 with a vertical interface 104. FIG. 5G depicts an asymmetrical raised element 60 with side having a portion that extends over the base of the raised element 60, wherein the upper portion of the raised element 60 comprises a first material 100 and a lower portion comprises a second material 102. FIG. 5H depicts a vertical interface 104 between two materials 100,102 in an asymmetrical raised element 60 wherein one side (e.g., the trailing side) is more elevated and wider than the other side (e.g., the leading side).

FIGS. 5A–5D show raised elements 60 having straight sides ascending from the base fabric 64 in a straight line, whereas the sides of the raised elements 60 in FIGS. 5E–5H include nonlinear (including curved) sections. In general, the sides or walls of raised elements 60 and deflection conduits 62 of the imprinting fabric 36 can be linear or nonlinear. In nonlinear embodiments, one or both sides of the raised element 60 when viewed in a two-dimensional cross-section (e.g., CD or MD cross-section) can exhibit a profile with one or two nonlinear sides. The use of nonlinear sides is expected to provide texture and tactile properties beyond what can be achieved with linear raised elements. For example, domes in the finished paper web 32 may be more rounded or visually appealing than those produced with typical imprinting fabrics, though tactile results will depend upon a myriad of other factors as well.

Figure 6:
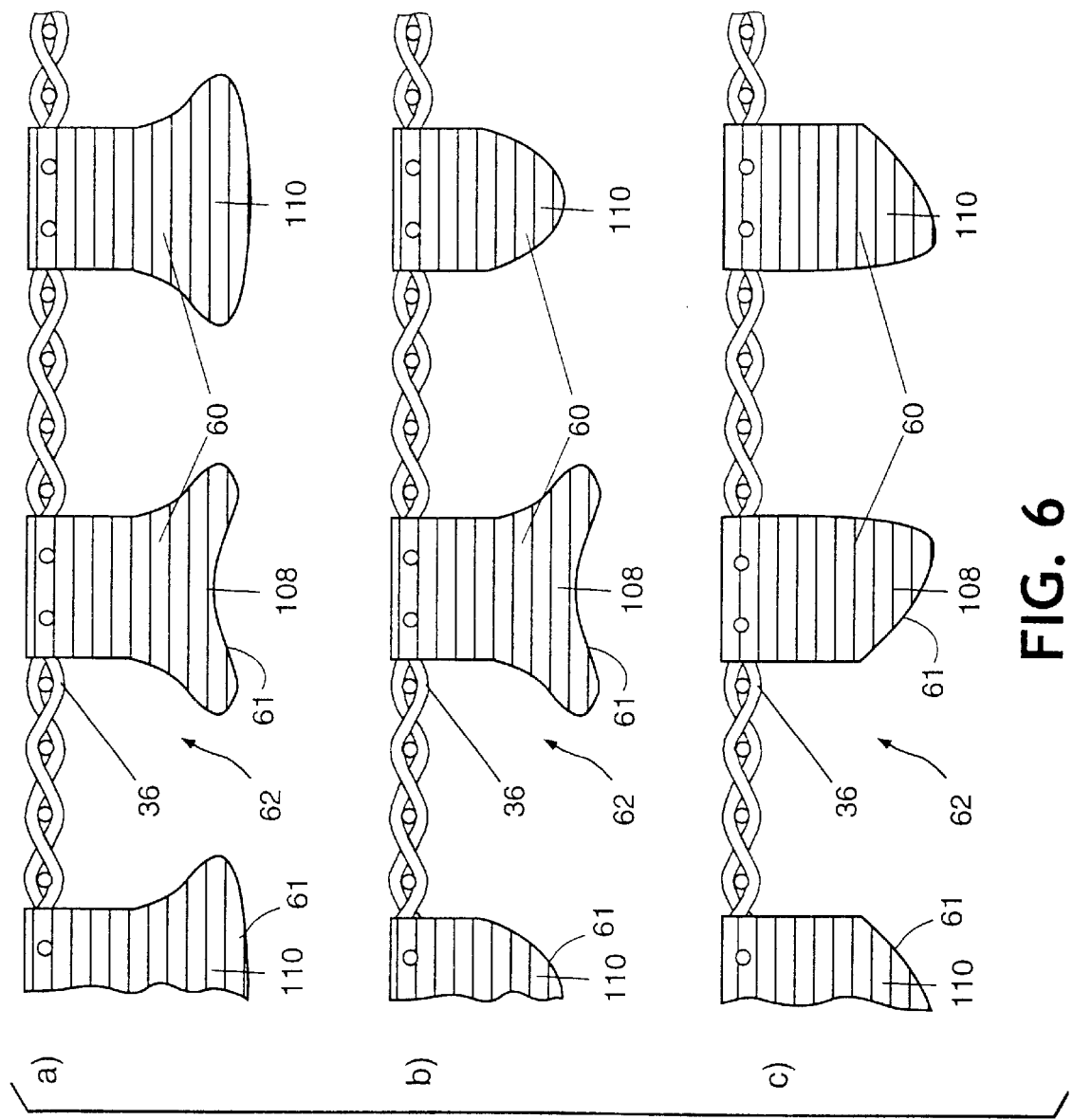
FIGS. 6A–6C show machine-direction cross-sections of deflection members comprising raised elements having a plurality of differing subsets.

FIGS. 6A–6C show machine-direction cross-sections of deflection members 36 comprising raised elements 60 having a plurality of subsets differing in shape, material properties, and/or height. FIG. 6A, for example, depicts a deflection member 36 having a first subset 108 of raised elements 60 having a saddle shape, and having a second subset 110 of raised elements 60 having a mushroom shape. Though only two subsets have been depicted, any number of subsets could be employed, such as 3, 4, 5, or 6 subsets, with the raised elements 60 of each subset arrayed in repeating patterns or in non-repeating patterns, including random patterns or non-repeating tilings such as a Penrose pattern or the amorphous patterns of U.S. Pat. No. 5,965,235, "Three-Dimensional, Amorphous-patterned, Nesting-resistant Sheet Materials and Method and Apparatus for Making Same," issued Oct. 12,1999 to McGuire et al.

The first subset 108 may be continuous, forming, for example, a grid or network such as a rectilinear grid, while the second subset 110 (or other subsets) may comprise discrete islands of raised elements 60 surrounded by the network of the first subset 108. Any number of such patterns can be contemplated within the scope of the present invention.

FIG. 6B is similar to FIG. 6A except that the second subset 110 has a rounded dome shape and has a lower elevation than the first subset 108 of raised elements 60. In FIG. 6C, the raised elements 60 of both the first subset 108 and the second subset 110 have similar asymmetrical shapes and elevations, but the first subset 108 is reversed relative to the second subset 110, meaning in this case that the side closest to the maximum in elevation is the trailing edge for one subset and the leading edge for the other (i.e., the first subset 108 is a mirror image of the second subset 110). The raised elements 60 of FIG. 6C have a top portion dominated with a sloped surface having a slope of up to about 45° from horizontal. Raised elements 60 in general need not be substantially flat but can have a dominant sloped portion having a departure from the horizontal of about 10 degrees or more, more specifically about 20 degree or more, and more specifically about 30 degrees or more, such as from about 15 degrees to about 50 degrees.

The first and second subsets 108, 100, respectively, may also comprise different materials having different elastic and mechanical properties such that one subset behaves differently in compression than the other subset. Differences in compression will also arise even with the same material being used in both subsets (or in all subsets, when more than two subsets of raised elements 60 are used).

When a deflection member 36 having two or more subsets of raised elements 60 is pressed against a paper web in a compression nip, wherein one subset deforms substantially more than another subset or exhibits different compressive behavior, the result can be nonuniform deformation of the web 32. Without wishing to be bound by theory, it is believed that such nonuniform deformation can yield local regions of shear where the web 32 is relatively more elongated in the plane of the web 32 than neighboring portions of the web 32. Such a mechanism can modify the way in which the web is texturized by the deflection member 36, resulting in properties and structures not heretofore achievable with conventional imprinting technology.

Figure 7:
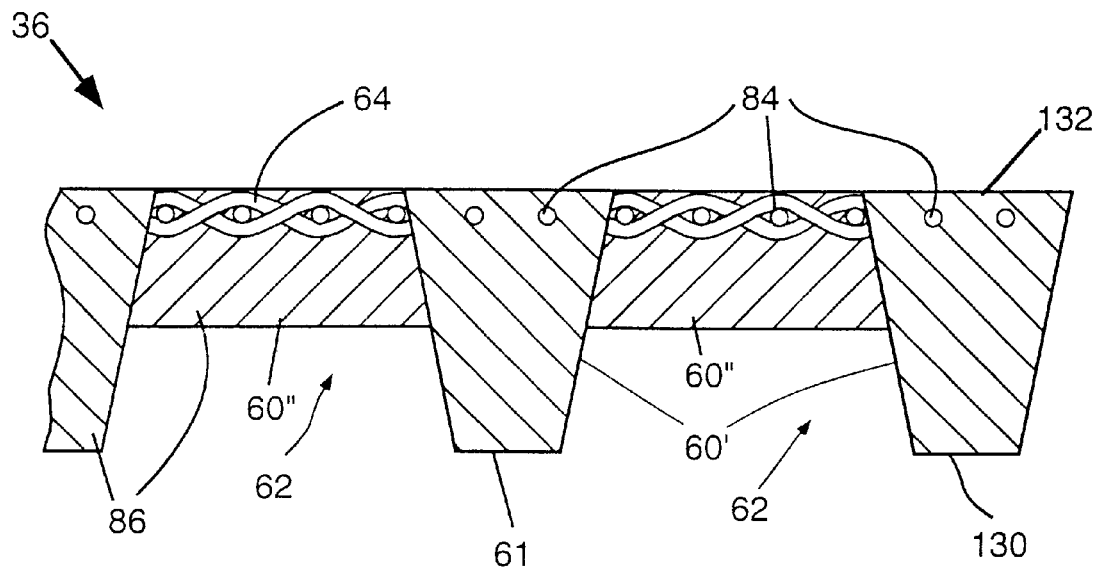
FIG. 7 depicts a deflection member that is impervious.

FIG. 7 shows another embodiment of the deflection member 36, wherein the deflection member 36 is substantially impervious, and can be made according to the teachings of U.S. Pat. No. 5,972,813, issued Oct. 26, 1999 to Polat et al., herein incorporated by reference. The deflection member 36 of FIG. 7 is based on the fabric of Polat et al., and comprises two primary components: a framework 86 and a reinforcing structure 84, which, as depicted here, comprises a woven base fabric 64. The framework 86 is disposed on the sheet side of the deflection member 36 and defines the texture. The framework 86 comprises two subsets of raised elements, 60' and 60", with the first subset 60' having a greater height than the second subset 60". Either the first or second subsets, 60' and 60", may be continuous, thereby surrounding discrete islands of the other subset, respectively.

The framework 86 can comprise a cured polymeric photosensitive resin or other curable resins.

The texture of the framework 86 defines a predetermined pattern, which imparts a like pattern onto the paper web 32 of the present invention. The pattern for the framework 86 can be an essentially continuous network, a semi-continuous network, or can comprise discrete islands of raised elements 60. By way of example only, continuous patterns are provided in U.S. Pat. No. 4,528,239, issued Jul. 9, 1985 to Trokhan; separate examples of both continuous and discrete patterns for imprinting fabrics (believed to be applicable to deflection members in general) are found in U.S. Pat. No. 4,514,345, issued Apr. 30, 1985 to Johnson et al.; and examples of semi-continuous patterns are provided in U.S. Pat. No. 5,714,041, issued Feb. 3, 1998 to Ayers et al.

If an essentially continuous network pattern is selected for the framework 86, the deflection conduits 62 will be discrete blind holes extending partway between the first surface 130 and the second surface 132 of the deflection member 36. The essentially continuous network 86 surrounds and defines deflection conduits 62.

The second surface of the deflection member 36 is the machine contacting surface, which may be made with a backside network having passageways therein which are distinct from the deflection conduits 62. The passageways provide irregularities in the texture of the backside of the second surface of the deflection member 36. The passageways allow for air leakage in the X-Y plane of the deflection member 36, which leakage does not necessarily flow in the z-direction through the deflection conduits 62.

The second primary component of the deflection member 36 according to the present invention is the reinforcing structure 84. The reinforcing structure 84, like the framework 86, has a first or paper facing side and a second or machine facing surface opposite the paper 32 facing surface. The reinforcing structure 84 is primarily disposed between the opposed surfaces of the deflection member 36 and may have a surface coincident the backside of the deflection member 36. The reinforcing structure 84 provides support for the framework 86. If one does not wish to use a woven fabric 64 for the reinforcing structure 84, a nonwoven element, screen, net, or a plate having a plurality of holes therethrough may provide adequate strength and support for the framework 86.

Figure 8:
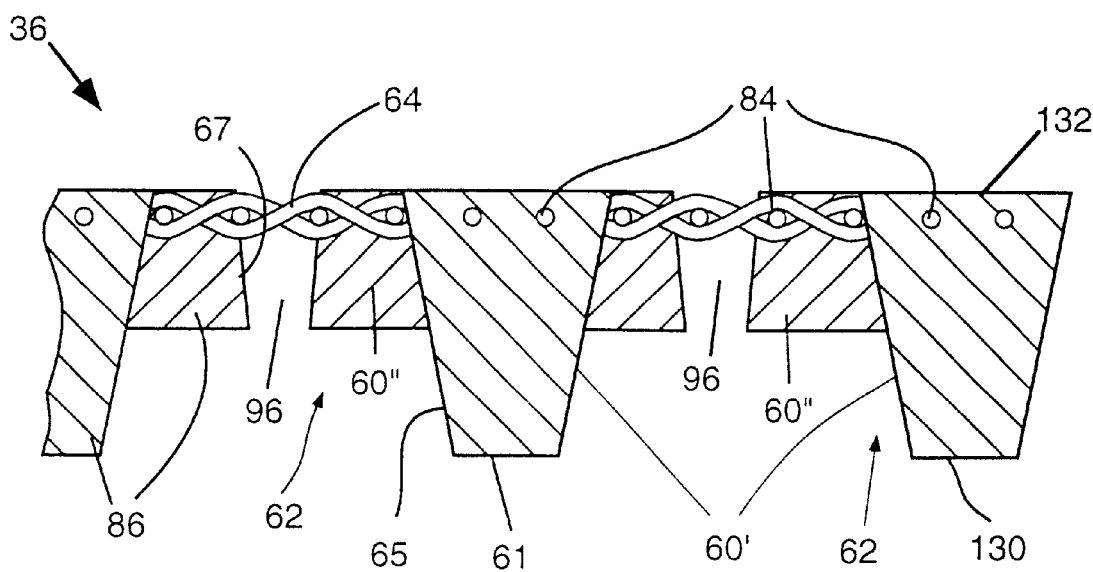
FIG. 8 depicts a deflection member having two subsets of raised elements differing in height.

FIG. 8 depicts a cross-section of a deflection member 36 similar to that of FIG. 7 but rendered liquid-pervious with openings 96 in the framework 86 and particularly in the lower, second subset of raised elements 60". The shape of the openings 96 may be cylindrical, or may taper to be narrower toward the web contacting side (as shown) or away therefrom. The openings 96 may be uniform throughout the deflection member 36 or may have a variety of sizes and shapes. The openings may be discrete or continuous.

In FIG. 8, the deflection conduit 62 is primarily defined by the sides of the first subset of raised elements 60' and the upper surface of the second subset of raised elements 60" (depicted facing toward the bottom of the diagram in FIG. 8), though the aperture 96 is also part of the deflection conduit 62. Thus, the deflection conduit 62 comprises an upper portion 65 with outwardly slanted walls and a narrower lower portion 67 with inwardly slanted walls (the nature of the slant is considered while traversing from the top, web-contacting side of the raised elements toward the base fabric). The deflection conduit 62 can also be characterized by having an upper portion 65 with a first width (e.g., a mean width) and a lower portion 67 having a second width, with a step change in width occurring between the two portions 65, 67. The deflection conduit 62 can also be characterized by having an upper portion 65 with a first width (e.g., a mean width) and a lower portion 67 having a second width, the first width being greater than the second width by about 30% or greater, more specifically about 50% or greater, more specifically still about 100% or greater, and most specifically about 200% or greater, with exemplary ranges including from about 80% to about 200%, or from about 150% to about 300%, or from about 250% to about 400%.

Figure 9A:
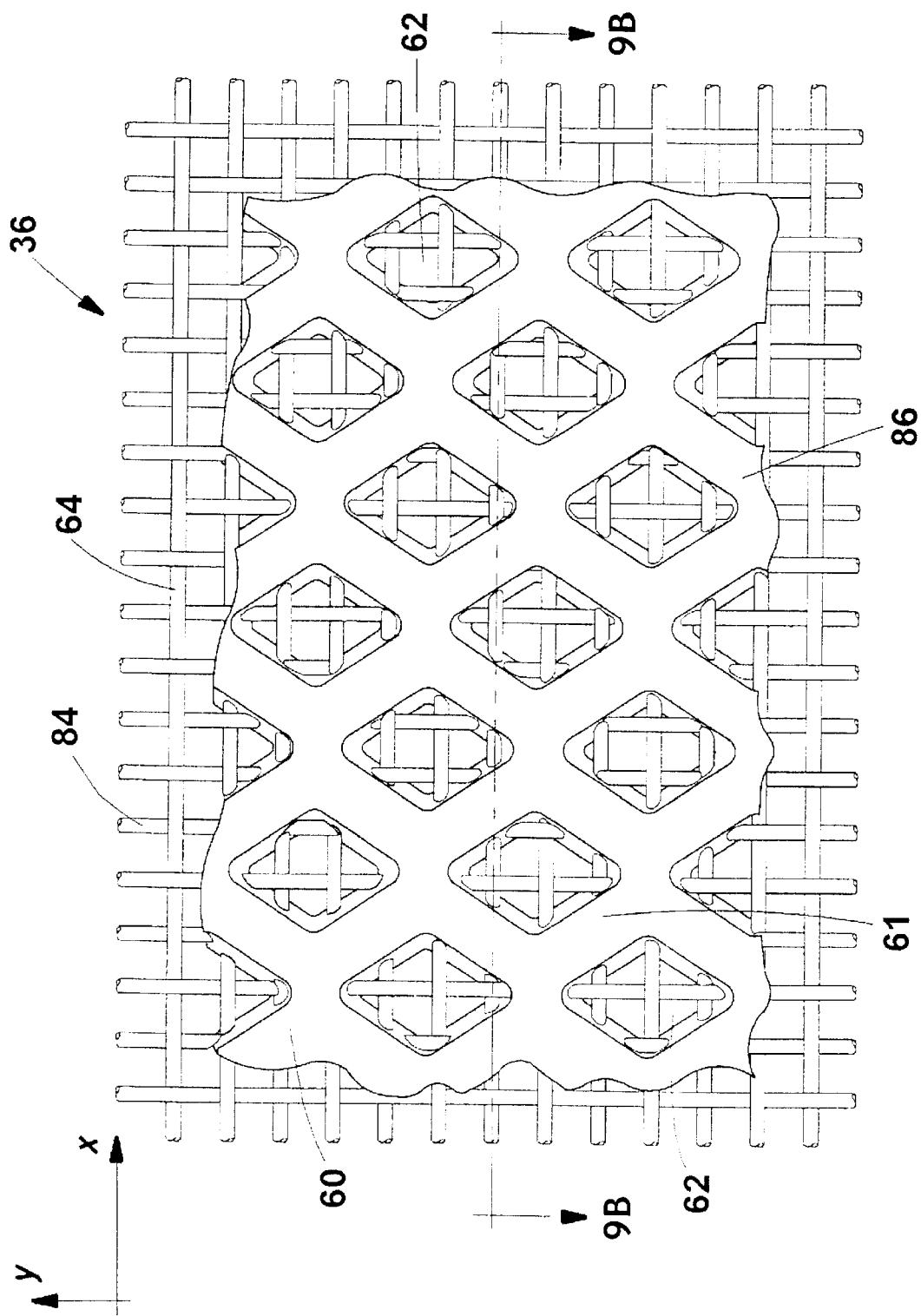
FIGS. 9A and 9B depict a top view and cross-sectional view of a deflection member having a continuous pattern of raised elements attached to a woven base fabric.
Figure 9B:
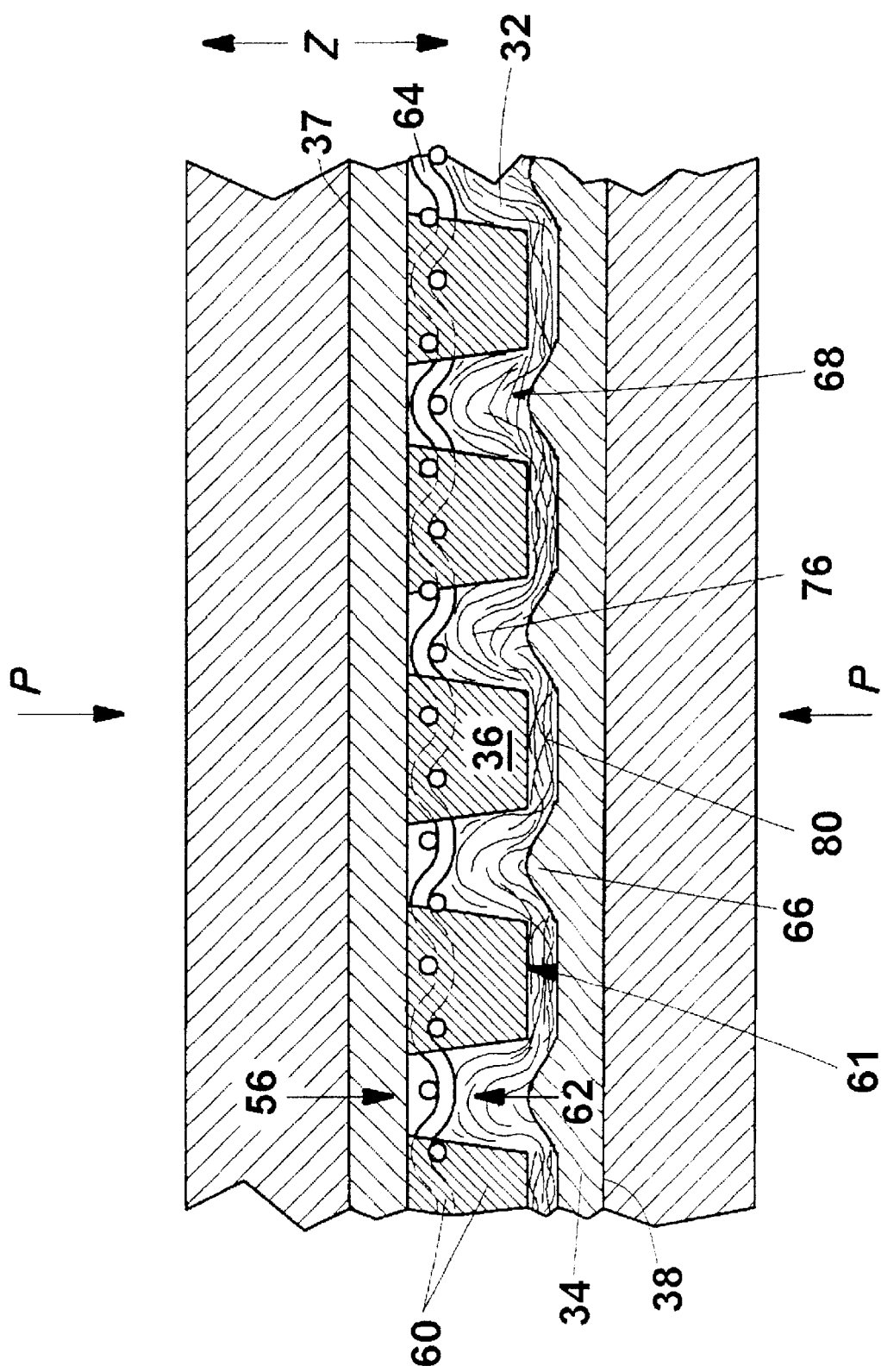

FIGS. 9A and 9B depict a top view and a cross-sectional view, respectively, of a liquid pervious deflection member 36 substantially similar in geometry to that disclosed in U.S. Pat. No. 5,935,381, "Differential Density Cellulosic Structure and Process for Making Same," issued Aug. 10, 1999 to Trokhan et al., herein incorporated by reference (see FIG. 2 and FIG. 2A therein). Though similar in geometry to the aforementioned fabric of Trokhan et al., the deflection member 36 of the present invention can comprise novel materials and construction methods as described herein, including elastomeric components, a heterogeneous assembly of two or more materials of differing properties in the raised elements, and resins cured without actinic radiation.

The deflection member 36 depicted here comprises a continuous network of raised elements 60 forming a web densifying surface 61, and comprises a repeating pattern of discrete deflection conduits 62. (Alternatively, the raised elements 60 could be discrete elements surrounded by a continuous grid of deflection conduits 62, or could comprise both a continuous pattern and discrete elements, such as a first pattern resembling an interconnected rectilinear grid and a second pattern of isolated geometric shapes, such as a flower or star, disposed within the parallelograms formed by the rectilinear grid.) The network of raised elements 60 comprises a cured resin which is held in place by a woven reinforcing structure 84 (a base fabric 64).

FIG. 9B depicts a cross-section of the deflection member 36 of FIG. 9A taken along the line 9B–9B, shown here in association with a paper web 32. The web 32 is pressed between opposing press surfaces 37, 38, which can be provided by opposing rolls, pressurized metal bands, flat platens which compress and retract to process successive segments of the web 36 in a batch-like manner, and so forth, with the presence of compressive pressure applied in the z-direction shown by the arrows P. While being pressed, the web 32 is in contact with a deformable carrier fabric 34 and the deflection member 36, which in turn is backed by the deformable backing fabric 56. The web 32 as it is pressed comprises a relatively high density region 80 associated with the web densifying surface 61 of the deflection member 36, and a relatively low density region 76 corresponding to the dome-like protrusions 68 formed in the deflection conduits 62. Depending on whether the raised elements 60 are part of a continuous grid or are discrete elements, the protrusions 68 can be discrete domes or an interconnected network of low density regions 76. One skilled in the art will understand that any given fiber may (and in many cases will) be partly in both the high density region 80 and the low density region 76. Portions of the deformable carrier fabric 34 are shown in FIG. 9B deforming as local mounds 66 into a portion of the deflection conduits 62, helping to deform the web 34 to impart a more three-dimensional topography.

Figure 10:
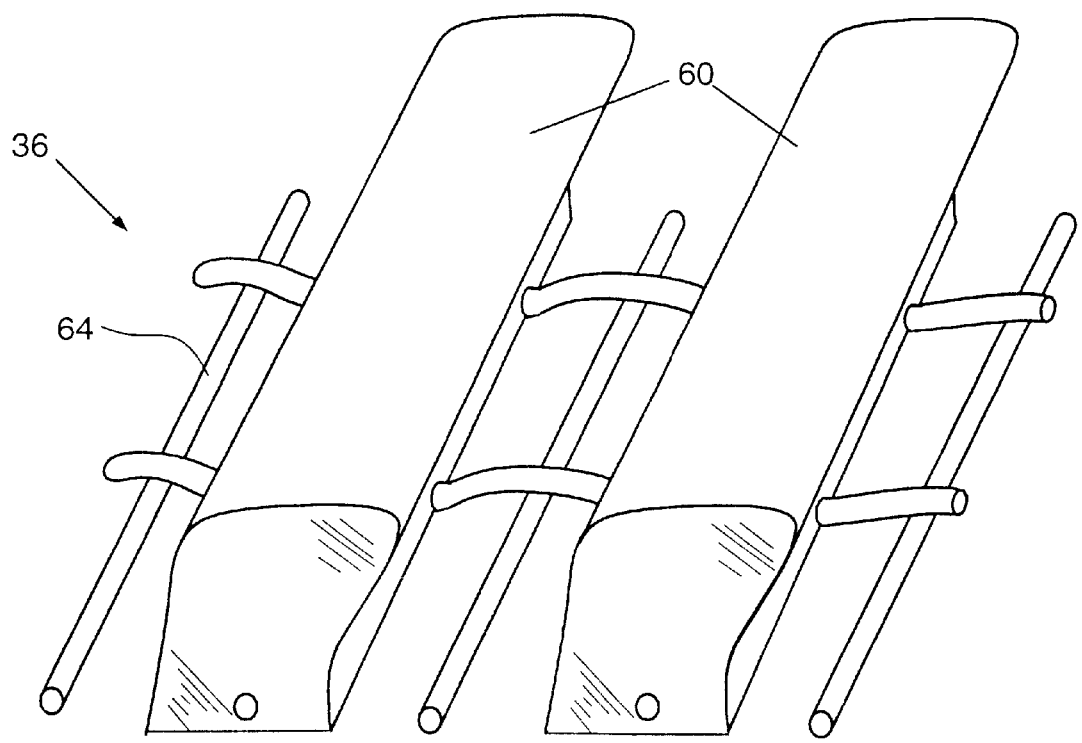
FIG. 10 is a perspective view of a portion of a deflection member comprising raised elements in the form of parallel bars attached to a woven substrate.

FIG. 10 depicts a perspective view of a portion of a deflection member 36 comprising a base fabric 64 joined to raised elements 60 having an asymmetrical shape. Here the raised elements 60 are depicted as repeating parallel bands or ribs, a semicontinuous embodiment, which may be oriented in either the machine or cross directions. Deflection members 36 comprising a woven base fabric 64 having raised elements 60 in the form of polymeric ribs of one or more heights in a pattern such as parallel bands or an interconnected grid are within the scope of the present invention. The ribs can be asymmetrical and/or composed of one or more dissimilar materials and/or comprise an elastomer.

Figure 11:
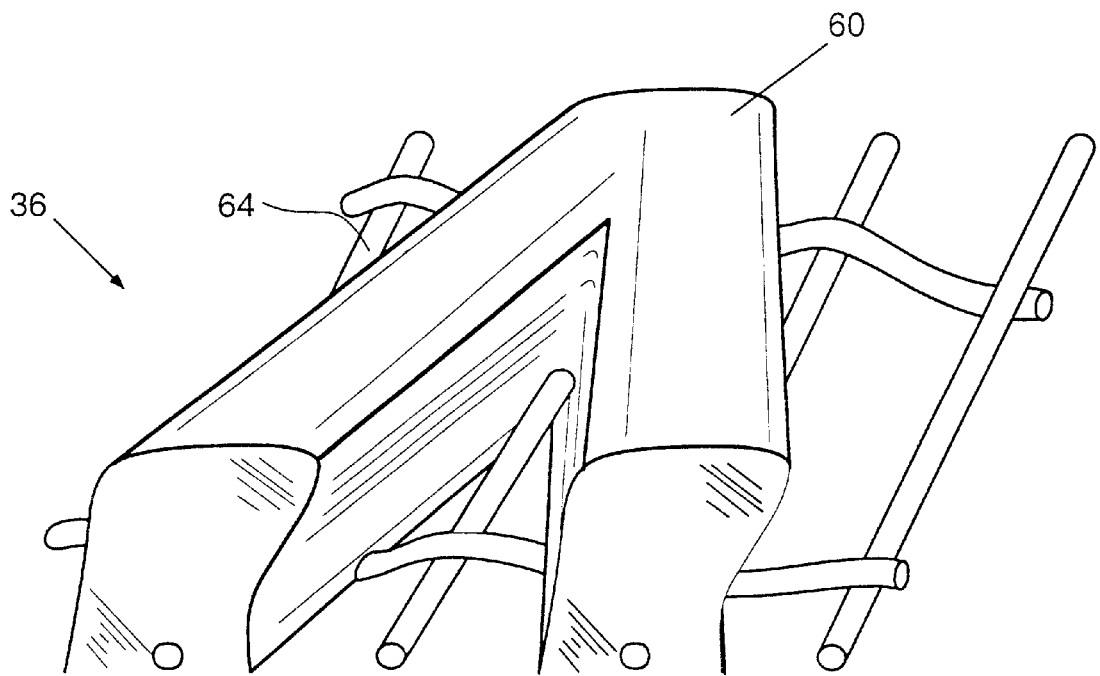
FIG. 11 is a perspective view of a portion of a deflection member showing part of a raised element attached to a woven substrate.

FIG. 11 depicts a perspective view of a portion of a deflection member 36 in which the raised element 60 as depicted can be a repeating unit cell or a portion of a repeating unit cell, in which the profile viewed in either the machine direction or cross direction will tend to be asymmetrical. The raised element 60 in FIG. 11 could be one half of the repeating unit cell of the deflection member 36 of FIG. 9A, modified to have crosssectional asymmetry. Such asymmetry can be produced by asymmetrical application of light in a photocuring step, or by asymmetrical application of other means such as mechanical tooling, rapid prototyping, stereolithography and the like.

Figure 12:
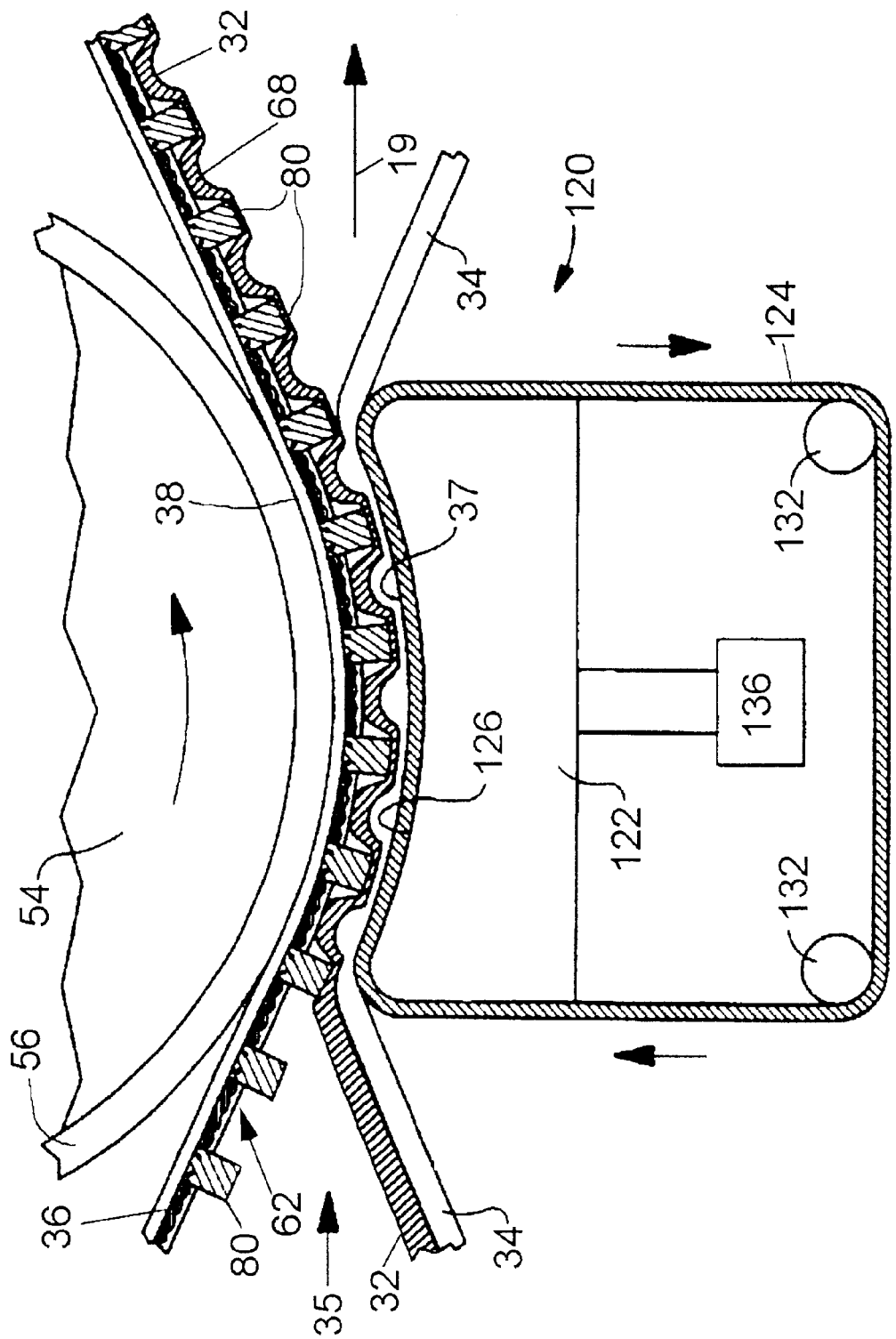
FIG. 12 is a cross-sectional view of a nip in a long shoe press wherein a moist paper web is transferred to a deflection member and molded thereon.

FIG. 12 depicts an embodiment in which the web 32 traveling in the machine direction 19 is pressed against the deflection member 36 between a deformable carrier fabric 34 and a deformable backing fabric 56 in a compression nip 35 formed by a shoe press 120 having an upper press roll 54 and a shoe 122. A belt 124 rides over the shoe 122 with a layer of lubricant (not shown) at the interface 126 between the belt 124 and the shoe 122 to reduce friction. The belt 124 is guided by rolls 132. A hydraulic pressure source 136 applied pressure to bias the shoe 122 toward the upper press roll 54. The hydraulic pressure source 136 can provide a varying force in the cross-direction to compensate for variability in the crown of the upper press roll 54 or in the other components of the nip 35. The web 32 resides on the deformable carrier fabric 34 prior to entering the nip 35, whereafter it resides on the deflection member 36. The upper press roll 54 may be a suction roll to enhance transfer to the deflection member 36. The belt 124 may be textured and/or deformable to further enhance the texture provided to the web in the nip 35. Texturing may be provided by laser engraving, ablation, abrasion, stamping, thermal molding, and the like. The belt 134 may be provided with blind holes or grooves. It may comprise one or more layers of elastomeric materials capable of deforming when pressed. It may further comprise reinforcement fabrics, fibers, or wires.

Figure 13:
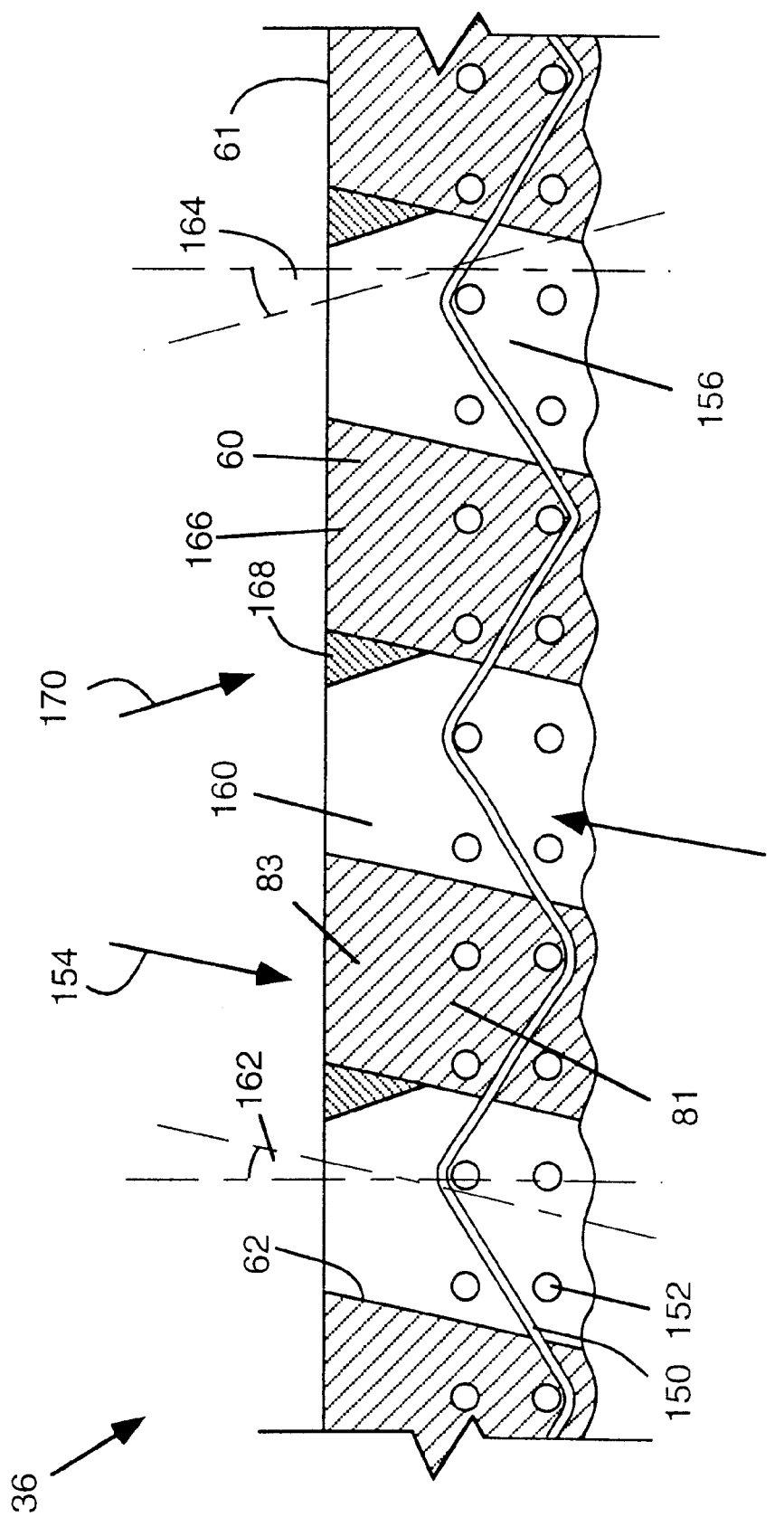
FIG. 13 is a cross-sectional view of a deflection member as it is being formed by curing of resin on a base fabric.

FIG. 13 depicts a cross-section a deflection member 36 as it is being cured. A base fabric 64 comprising two sets of orthogonal filaments 150, 152 woven together has been impregnated with a resin layer 156 of uniform height. Raised elements 60 for the deflection member 36 have been cured in the resin by application of curing radiation through a first mask (not shown) at a first angle 162 relative to vertical, providing radiation in the direction shown by the first arrow 154, providing a first portion 166 of the raised elements 60. Thereafter, curing radiation through a mask that can be a second mask (not shown) is applied at a second angle 164 (with the radiation traveling in the direction shown by the second arrow 170) to cure a second portion 168 of the raised elements 60, the second portion 168 being joined to the first portion 166. The second portion 168 extends the width of the upper portion 83 of the raised elements 60, such that the upper portion 83 is wider than the base portion 81. This effect can be achieved by changing the angle of a radiation source without moving the mask, or by changing both the position of the radiation source and the mask.

The uncured portion 160 of the resin layer 156 can be removed after curing of the raised elements 60 by washing, solvent extraction, centrifugal force, gravitational flowing at an elevated temperature to render the resin less viscous, and so forth. Removal of the uncured portion 160 exposes the walls of open deflection conduits 62.

The Base Fabric

Figure 5:
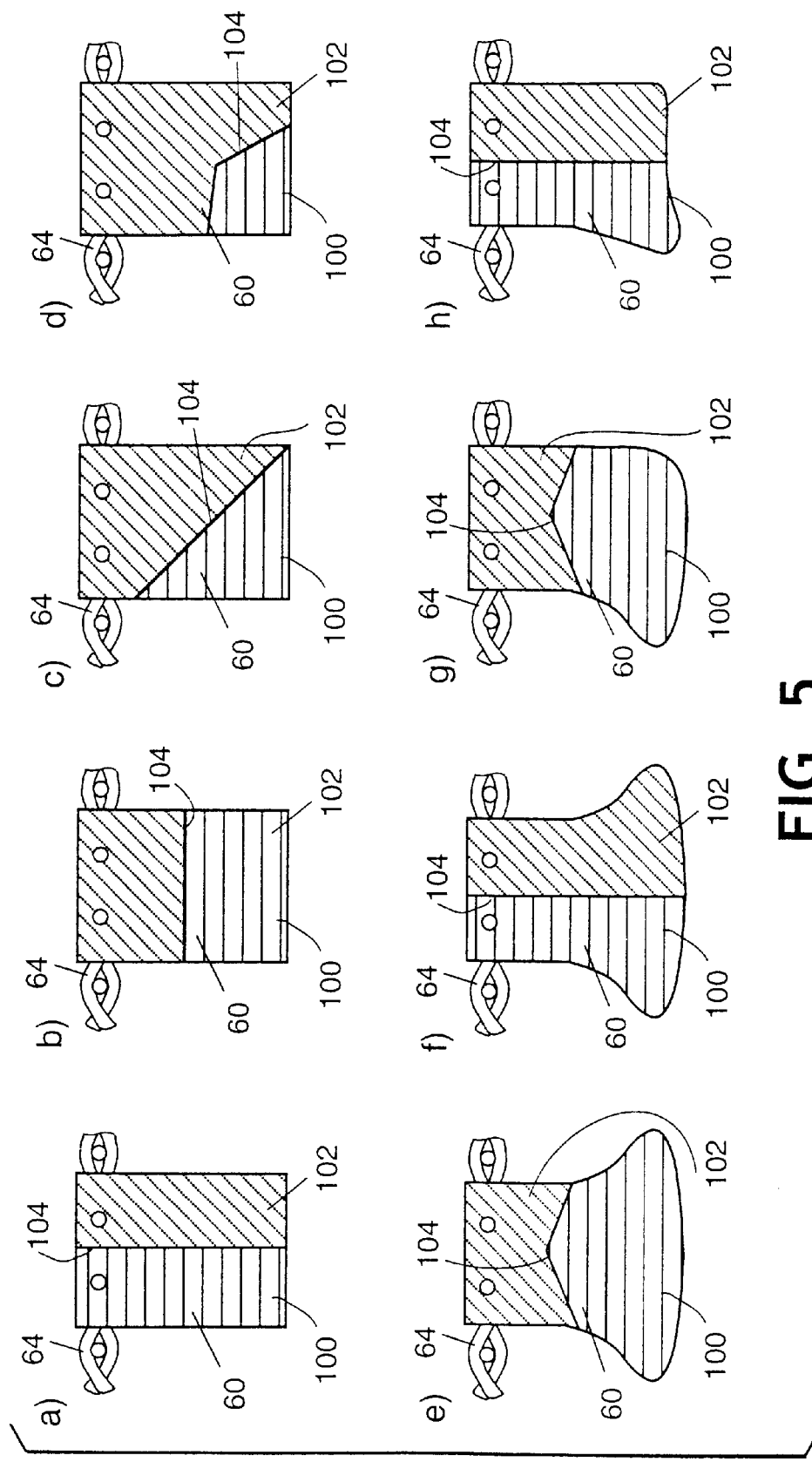
FIGS. 5A–5H depict embodiments of the deflection member having raised elements comprising two zones of differing materials.

The base fabric can take any number of different forms. It can comprise a woven element, a nonwoven element, a screen, a net, a scrim, or a band or plate having plurality of holes. The base fabric can comprise a woven element, and more particularly, a foraminous woven element, such as disclosed in U.S. Pat. No. 5,334,289 which patent is incorporated by reference herein. In one embodiment, the base fabric can comprise a first layer of interwoven yarns and a second layer of interwoven yarns being substantially parallel to each other and interconnected in a contacting face-to-face relationship by tie yarns. The first layer and the second layer can individually comprise a plurality of machine-direction yarns interwoven with a plurality of cross-machine direction yarns. This type of fabric is illustrated in FIG. 5 of U.S. Pat. No. 5,840,411, issued Nov. 24, 1998 to Stelljes, Jr. et al., herein incorporated by reference.

While a woven element can be used for the base fabric of the present invention, a papermaking belt according to the present invention can be made using a felt as a reinforcing structure, as set forth in the patents: U.S. Pat. No. 5,817,377, issued Oct. 6, 1998 to Trokhan et al.; U.S. Pat. No. 5,556,509, issued Sep. 17, 1996 to Trokhan et al.; and U.S. Pat. No. 5,871,887, issued Feb. 16, 1999 to Trokhan et al., all of which are herein incorporated by reference to the extent compatible with the present specification.

The base fabric, prior to application of resin and addition of raised elements, can be highly permeable, meaning that it can have an air permeability greater than about 800 cubic feet per minute (cfm) per square foot of its surface at a pressure differential of 100 Pascals. The base fabric can have an air permeability between about 900 and about 1100 cfm per square foot of its surface at a pressure differential of 100 Pascals. More specifically, the air permeability can be between about 950 and about 1050 cfm per square foot at a pressure differential of 100 Pascals.

The base fabric can function to support the fibers fully deflected into the conduits, not allowing them to be blown through the deflection member. Therefore, the deflection member can provide high fiber support, meaning that the base fabric of the present invention has a Fiber Support Index of not less than about 75. As used herein, the Fiber Support Index or FSI is defined in Robert L. Beran, "*The Evaluation and Selection of Forming Fabrics*," Tappi April 1979, Vol. 62, No. 4, which is incorporated by reference. The base fabric of the present invention can have an FSI not less than 85. More specifically, the FSI is greater than 90.

The base fabric can be nonwoven or woven. It can comprise conductive elements or be substantially nonconductive, and can have a single, integral layer of material or comprise a plurality of layers laminated or otherwise joined together. One or more layers of the base fabrics (or of the complete deflection member) can be laser drilled or apertured, or all layers may be free of laser-drilled apertures and/or free of mechanically created apertures (i.e., apertures created by stamping, cutting, or perforating).

The Deflection Member: Production and Photocuring

The deflection member comprises raised elements having a web densifying surface (also known as the web imprinting surface for use in imprinting operations) and a deflection conduit portion into which a wet web can be deformed to form structures such as domes dispersed between high density regions of a web that were pressed against the raised elements. Deflection members can be any one of several classes, including fabrics primarily comprising woven webs; fabrics comprising a woven or nonwoven foraminous base with resin elements added to the base; materials with elevated structures such as nonwoven webs, sintered materials, films, or foam elements, the elevated structures residing on a base such as a woven fabric; and fabrics comprised of one of more layers of porous film or sheets that have not been woven but have been provided with holes or apertures.

The texture of the web-contacting side of the deflection member can be imparted to a paper web by imprinting, pressing, or by other means of applying a force to the paper web as it is in contact with the deflection member. When the sheet is pressed against the deflection member with a sufficiently high force, the web will receive a texture from the interaction of the web with the raised elements and the deflection conduits, and will have differential density imparted to it. The raised elements can have a depth in the z-direction relative to the upper surface of the base fabric of at least about 30 micrometers, more specifically at least about 100 micrometers, more specifically still at least about 200 micrometers, and still more specifically at least about 500 micrometers. A suitable range for producing an absorbent, thick, soft aesthetically pleasing tissue paper is from about 300 to 1000 micrometers (0.3 mm to 1 mm), or, for more highly texture webs, from about 600 to 3000 micrometers (0.6 mm to 3 mm).

The deflection member can be made according to any of the following: U.S. Pat. No. 4,529,480, issued Jul. 16, 1985 to Trokhan; U.S. Pat. No. 4,514,345, issued Apr. 30, 1985 to Johnson et al.; U.S. Pat. No. 4,528,239, issued Jul. 9, 1985 to Trokhan; U.S. Pat. No. 5,098,522, issued Mar. 24, 1992; U.S. Pat. No. 5,260,171, issued Nov. 9, 1993 to Smurkoski et al.; U.S. Pat. No. 5,275,700, issued Jan. 4, 1994 to Trokhan; U.S. Pat. No. 5,328,565, issued Jul. 12, 1994 to Rasch et al.; U.S. Pat. No. 5,334,289, issued Aug. 2, 1994 to Trokhan et al.; U.S. Pat. No. 5,431,786, issued Jul. 11, 1995 to Rasch et al.; U.S. Pat. No. 5,496,624, issued Mar. 5,1996 to Stelljes, Jr. et al.; U.S. Pat. No. 5,500,277, issued Mar. 19, 1996 to Trokhan et al.; U.S. Pat. No. 5,514,523, issued May 7, 1996 to Trokhan et al.; U.S. Pat. No. 5,554,467, issued Sep. 10, 1996, to Trokhan et al.; U.S. Pat. No. 5,566,724, issued Oct. 22, 1996 to Trokhan et al.; U.S. Pat. No. 5,624,790, issued Apr. 29, 1997 to Trokhan et al.; U.S. Pat. Nos. 6,010,598, issued Jan. 4, 2000 to Boutilier et al.; and U.S. Pat. No. 5,628,876, issued May 13, 1997 to Ayers et al., the disclosures of which are incorporated herein by reference.

The raised elements can be applied to a reinforcing structure as taught by U.S. Pat. No. 5,556,509, issued Sep. 17, 1996 to Trokhan et al.; U.S. Pat. No. 5,580,423, issued Dec. 3, 1996 to Ampulski et al.; U.S. Pat. No. 5,609,725, issued Mar. 11, 1997 to Phan; U.S. Pat. No. 5,629,052, issued May 13, 1997 to Trokhan et al.; U.S. Pat. No. 5,637,194, issued Jun. 10, 1997 to Ampulski et al. and U.S. Pat. No. 5,674,663, issued Oct. 7, 1997 to McFarland et al., the disclosures of which are incorporated herein by reference.

A suitable deflection member according to present invention may be made by utilizing a photosensitive resin as described in the above-referenced patents. However, for one useful embodiment described below, several deviations from the above-mentioned prior art manufacturing processes are set forth below.

In one embodiment, liquid photosensitive resin is provided. Any suitable resin can be used, including acrylates, which historically have been widely accepted in photocuring systems, primarily because of the wide range of suitable initiators that can be successfully applied. One example of a liquid photosensitive resin is Merigraph L055 available from MacDermid Imaging Technology, Inc. of Wilmington, Del. Epoxy type resins, such as bisphenol-A-diglycidyl ethers, novolac-epoxy resins, and cycloaliphatic epoxy can also be used, including mixtures of epoxy resins with silanes, acrylates, or other resins or monomers.

Suitable liquid photosensitive resins can further include polyimides capable of final curing at room temperature. *NASA Tech Briefs*, March 1999, p. 52–53 describes room-temperature UV curing of polyimides with a new Diels-Alder route involving photoenolozation of methylphenyl ketones. Prior methods for curing polyimides required temperatures above 200° C. Such polyimides can also be adapted for UV-cured fabrics for use in the present invention.

Poly(cis-isoprene) and its derivatives, known to be useful in negative photoresist methods, can also be used.

U.S. Pat. No. 4,668,601, issued May 26,1987 to J. F. Kistner, herein incorporated by reference, discloses a UV curing technology which can be applied to fabrics of the present invention. Kistner discloses a resin comprising a polymerizable epoxy-functional silane compound and a cationic photoinitiator. Photoinitiators in the present invention can include any known photoinitators, including cationic, anionic, or free-radical types. Likewise, the monomers of the curable resins of the present invention can be cationically or anionically polymerizable or polymerizable without ionic photoinitiators. Exemplary cationic photoninitators, for example, include iodonium or sulfonium compounds, which can be used in epoxy resins, vinyl ethers, acrylates, and other resins. Anionic photoinitiators are disclosed in U.S. Pat. No. 5,652,280, issued Jul. 29, 1997 to C. R. Kutal, herein incorporated by reference.

Monomers, oligomers, and polymers that can be modified by anionic photoinitiation are those that are capable of reaction on attack by an anionically charged nucleophile, including but not limited to ethylene, 1,3-dienes, styrene and alpha-methyl styrene, acrylates and methacrylates, acrylonitrile, methacrylonitrile, acrylamide and methacrylamide, and aldehydes and ketones, and oligomers and polymers containing these moieties. Suitable substrates also include monomers, oligomers, and polymers that undergo anionic ring-opening polymerization or crosslinking reactions, for example, N-carboxy-alpha-amino anhydrides, cyclic amides, cyclic esters, epoxides and siloxanes. Preferred monomers are ethylenically unsaturated monomers that contains electron-withdrawing substituents to stabilize the negative charge, for example, ethyl alpha-cyanoacrylate (see equation 5) and methyl alpha-trifluoromethylacrylate.

The resin system can also comprise one or more antioxidant compounds, according to U.S. Pat. No. 6,010,598, issued to Boutilier et al. on Jan. 4, 2000; and U.S. Pat. Nos. 5,059,283 issued to Hood et al. on Oct. 22, 1991 and U.S. Pat. No. 5,0573,235 issued to Trokhan on Dec. 17, 1991, the pertinent parts of which are incorporated herein by reference. Antioxidants can be added to prevent the resinous polymer from oxidizing and causing degradation of the deflection member. Suitable chemicals which may be used as antioxidants include but are not limited to: high molecular weight hindered phenols, secondary amines, phosphates, phosphites, thioesters, sulfur-containing compounds and secondary sulfides. By way of example only, commercially available antioxidants can include: Irganox 1010 marketed by Ciba Geigy Corp. of Hawthorne, N.Y. and Cyanox 1790 marketed by Cytec Industries Inc. of West Paterson, N. J. Antioxidants can be added in a concentration of from about 0.001% to 5.0% by weight.

Resins curable by radiation other than UV light or visible light can also be considered, such as resins curable by electron beam radiation or gamma radiation, when the radiation sources are applied in a suitable pattern or through a suitable mask.

General principles of radiation curing of polymers are discussed in *Radiation Curing in Polymer Science and Technology: Fundamentals and Methods*, ed. by J. P. Fouassier and J. F. Rabek, Vol. 1, Elsevier Applied Science, 1993 (ISBN: 1851669299), and *Radiation Curing in Polymer Science and Technology: Photoinitiating Systems*, ed. by J. P. Fouassier and J. F. Rabek, Vol. 2, Elsevier Applied Science, 1993 (ISBN: 1851669337).

In one embodiment, the resin is disposed on a backing surface such as a large roll. A mask having transparent and opaque regions is juxtaposed with the photosensitive resin. Actinic radiation such as ultraviolet light is passed through the transparent regions of the mask. Alternatively, visible light is passed through the mask if visible light photoinitiators are used, or an electron beam can be passed through the mask for electron beam curing of the resin, or other radiation sources suited for curing the resin are passed through the mask. The radiation passing through the transparent regions of the mask cures the resin therebeneath to yield an impermeable region in the deflection member. After curing, described more fully below, uncured resin is removed by washing, solvent extraction, or other means, leaving a cured web with a three-dimensional structure.

The above-mentioned process can be considered as a negative photoresist method, in which the regions of the resin exposed to light become hardened relative to the unexposed regions. However, a positive photoresist method can also be applied, in which the light-exposed regions of the resin are softened relative to the unexposed resin and subsequently removed by solvents or other means. Thus, curing of a resin can be achieved with positive or negative photoresist methods.

In another embodiment, more than one mask is used. Thus, in a negative photoresist method of forming an imprinting fabric, a first portion of the resin is at least partially cured using a radiation source applied for a predetermined period of time through a first mask having a first pattern. Then a second portion of the resin is at least partially cured using a radiation source applied for a predetermined period of time through a second mask having a second pattern. The radiation source may be the same for both steps or a different radiation source may be used in the second step. For example, visible light of a first wavelength range or electron beam radiation may be used with the first mask, whereafter ultraviolent radiation or visible light radiation of a second wavelength range may be used with a second mask. Additional steps of applying radiation sources through additional masks may also be considered.

The use of two or more masks having different patterns is one of several methods for the creation of cured resin elements having complex shapes. Rather than being limited to elements having straight sides, curved or bent sides can be created. For example, a first mask having small openings can cure narrow, straight-sided elements. Then the mask can be changed to a similar pattern with larger openings, still in registration with the pattern of cured regions from the first mask. Curing radiation is then applied to selectively cure the upper portions of the uncured resin beneath the expanded openings of the second mask. The curing radiation may be of a wavelength that does not penetrate the uncured resin to a significant depth (e.g., a shorter wavelength ultraviolet radiation source or an electron beam or visible light coupled with a photoinitiator comprising a bleachable dye to absorb the light and promote curing in the upper layers of the resin). Application of the radiation through the mask for a limited period of time will result in elements of cured resin that are narrow at the base and grow broad near the top surface.

Curing could also be accomplished with a first radiation source applied through a first mask below the fabric, to cure resin in contact with the base fabric, while radiation from a second source above the fabric is applied through a second mask to cure resin above the base fabric. The interaction of the two patterns and the two sources of radiation can result in a variety of complex patterns, including elements that either grow wider or more narrow as they rise from the base fabric. Two or more subsets of elements may be created, such as one subset that grows narrower and one subset that grows wider as they rise from the base fabric.

In still another embodiment, the orientation of the mask or the light source relative to fabric changes with time during curing. By moving the relative positions over time, curved surfaces and changing slopes can be created. Also two or more radiation sources positioned at different locations over the fabric can be used, and the relative intensities of the sources can be changed with time to create complex shapes of the elements formed by curing.

UV photocuring techniques and equipment therefore are well known and principles therefor are taught in previously cited patents. By way of specific equipment, UV curing can be achieved using devices such as those produced by UV Process Supply, Inc., Chicago, Ill, as described in their 1998 catalog (UVPS-CA98).

Fabrics formed by adding resin elements to a woven base can be formed in a variety of ways (most of which can also be applied to the addition of resin elements to a nonwoven base), including application of a resin over much or all of a woven base followed by selective curing of particular regions, such as UV curing through a stencil or mask to selected portions of the resin only, followed by removal of uncured resin through application of a solvent or other means. Alternatively, resins can be added directly in a pattern without the need for photocuring if the resin is self-curing (i.e., an epoxy resin after mixing with an initiator) or is cured or solidified by other means, such as thermal curing or cooling of a molten thermoplastic. For example, a woven base fabric could be held against a mold for receiving a resin in liquid state which hardens in contact with the base fabric, with a texture imparted by the substrate which held the resin against the fabric.

For photocuring (or radiation curing, more generally speaking) of resin, radiation can be bombarded on the deflection member both in the direction perpendicular to the plane of the deflection member and in off-axis, i.e., non-perpendicular directions. By providing off-axis radiation, a portion of the resin registered with, but beneath, the opaque regions of the mask is cured, along with the resin registered with the transparent regions of the mask. However, such curing beneath the opaque regions occurs at a finite depth below the mask. The regions of the resin immediately beneath the opaque regions of the mask may not cure, due to the incident angle of the radiation. The off-axis, i.e., non-perpendicular, radiation should be sufficient to cure the resin throughout the X-Y plane of the deflection member. For one embodiment for producing a fabric with an asymmetrical profile in the raised elements (or in the deflection conduits), actinic radiation is applied from only one direction varying from the perpendicular at an angle of 10 degrees or more; more specifically 14 degrees or more; more specifically still about 20 degrees or more; and most specifically still from about 25 degrees to about 45 degrees.

In another embodiment, a raised element is cured by radiation applied from two or more angles, as described above in connection with FIG. 13, either through the use of two or more radiation sources or by the use of one radiation source which is moved to a second position after initially treating the resin from first position. Alternatively, radiation may be applied successively through two or more masks, either from one or from a plurality of angles, to create more complex structures than previously known.

The principle of applying radiation from two or more angles (including continuously varied angles) can also be extended to manufacturing methods other than radiative curing. For example, complex structures can be produced from a plastic web by laser drilling, wherein the angle of incidence of the laser radiation is varied during production to produce deflection conduits having walls with two or more angles, such as conduits with a leading machine direction edge having an angle greater than 15 degrees away from the vertical, and a trailing edge that is substantially vertical. The leading edge can have a positive inclination (such that the top of the conduit is wider than the base) or a negative inclination (such that the top of the conduit is narrower than the base). Rapid prototype manufacturing that employs light or other forms of radiation can also employ a plurality of radiation angles.

To achieve some aspects of the present invention, it can be desirable to impart certain mechanical and geometrical properties to the deflection member. Many such properties can be obtained with known UV-cured imprinting fabrics and other fabrics known in the art, but suitable fabrics can also be obtained through the application of technologies other than UV-curing such as visible light photocuring, including, for example, three-component photoinitiator systems suitable for use with visible laser light optical systems. Visible light photocuring eliminates some of the safety concerns associated with ultraviolet processing and also has the potential to offer reduced cost. The spectrum of the visible light can be substantially monochromatic, such as is characteristic of laser light, or a combination of less than 10 monochromatic frequencies, or can have a broad distribution characteristic of light from lamps or other non-coherent sources. The visible light can have a maximum intensity at a wavelength of any one of the following: about 400 nm or greater, about 450 nm or greater, about 500 nm or greater, about 550 nm or greater, about 600 nm or greater, with exemplary ranges of 410 nm to 1100 nm, more specifically from about 450 nm to about 800 nm; and more specifically from about 500 nm to about 750 nm.

In one embodiment, a fabric is prepared with a first resin and a second resin, separately curable by visible and UV light, respectively, wherein curing can be performed in successive steps or simultaneously to provide two or more patterns of cured materials having different material properties. For example, treatment with visible light could be conducted first, followed by further treatment with UV light. In general, photocured deflection members need not be produced with actinic radiation or ultraviolet light in particular, but can also be produced with non-actinic visible or infrared light, or by radiation from non-UV sources as electron beams or gamma rays applied through a suitable mask to shield the curing radiation from regions of the resin that are to remain uncured and readily removable. Pulsed light or flash curing systems can be used, as well as continuous light sources. Useful pulsed light systems and continuous light systems are available from Xenon Corp. (Woburn, Mass.) or UV Process Supply, Inc. (Chicago, Ill.).

Visible light photocuring can be achieved with the three component photoinitiator systems described by Kathryn Sirovatka Padon and Alec B. Scranton of Michigan State University in "Recent Advances in Three Component Photoinitiator Systems," *Recent Research Development in Polymer Science*, Vol. 3, pp. 369–385, 1999.

According to Padon and Scranton, typical UV photocuring methods rely on photoscission excited by the absorption of ultraviolet light, which brings the photoinitiator into a triplet state wherein the bond alpha to the carbonyl group is cleaved, yielding a benzoyl radical and a second fragment. Examples of such photoinitiators include benzoin ethers, dialkoxyacetophenones, hydroxy alkyl ketones, benzoyl oxime esters, amino ketones, and morpholino ketones, all of which absorb via the benzoyl chromophore in the spectrum range of about 150 to 400 nm. Gamma cleavage may also occur for some alpha-cleavable photoinitiators.

The use of more than one component is required for some photoinitiators. Bimolecular reactions involving hydrogen abstraction are involved in one class of known photoinitiators, for example, including the benzophenone and thioxanthone families. Bimolecular reactions involving electron transfer is somewhat more common. In this system, a photoinitiator in a triplet state forms an exciplex with an electron donor, typically an amine, according to Padon and Scranton. When the electron is transferred, followed by proton transfer from the amine to the photoinitiator, neutral amine and ketyl radicals are formed. The electron transfer mechanism can occur for benzophenones, thioxanthones, benzil derivatives, ketocoumarins, xanthones, and camphorquinone.

For visible light photoinitiation, many dyes and other compounds are known for which bimolecular mechanisms occur involving electron transfer initiators. Iron-arene complexes and titanocene derivatives are also known for visible light systems, and even some alpha-cleavable systems are known with absorption maxima beyond 300 nm.

A recent development has been three-component systems for visible light photoinitiation. These systems comprise a dye or other light absorbing compound, an electron donor which can be an amine, and third component that is typically an iodonium salt which can accept an electron. Typical electron donors include N-methyldiethanolamine, N-phenylglycine, sodium toluene sulfinate, N,N-dimethylacetamide, 4,4-dimethoxybiphenyl, N,N-dimethylurea, triethylamine, and ferrocene. Diphenyliodonium chloride is the most commonly used third component, but other iodonium salts can be used, including those with less nucleophilic counterions such as $AsF_6^-$, $PF_6^-$, $SbF_6^-$, $BF_4^-$, $Br^-$, $I^-$, $C_6H_5SO_3^-$, and $SbF_5OH^-$. Substituted iodonium c can also be used. Known substitutes for iodonium can also be applied, including bromine compounds, metallocenes, and sulfonium salts. Specific known third components listed by Padon and Scranton include 2,2,2-tribromoacetophenone, and iron arene complexes such as that described by Fouassier et al, *Polymer*, Vol. 38, 1997, p. 1415. Such three-component systems require less energy to be activated than typical two-component systems. In many three-component systems, the dye undergoes photobleaching, allowing light to pass deeper into the resin as curing occurs, enabling the curing of relatively thick resin deposits. See, for example, V. Narayanan and A. B. Scranton, Trends in Polymer Science, Vol. 5, 1997, p. 415. One useful system is disclosed in U.S. Pat. No. 5,229,253, issued Mar. 8, 1991 to R. Zertani, herein incorporated by reference. Zertani discloses a photopolymerizable mixture comprising a polymeric binder, a compound which is polymerizable by free radicals and at least one polymerizable group and a photoreducible dye plus a dicyclopentadienyl bis(2,4,6-trifluorophenyl)-titanium or -zirconium as the photoinitiator. The mixture is said to be suitable for producing printing plates and photoresists and is distinguished by particularly high photosensitivity in the visible region of the spectrum. It can be imaged, for example, with laser radiation in the visible region. Another three-component system is disclosed in U.S. Pat. No. 4,735,632, issued to J. D. Oxman et al., Apr. 5, 1988, herein incorporated by reference. Photopolymerization of an acrylic monomer (phenoxy diethyleneglycol acrylate) using an argon ion laser (visible light with a wavelength of 488 nm) was made possible with Kodak Reagent 14875, a ketocoumarin compound (3,3'-carbonyl-bis-7-diethylaminocoumarin) in the presence of an amine (e.g., N-phenylglycine) and an onium salt (e.g., diphenyl iodonium chloride), according to J. P. Fouassier et al., "A New Three-component System in Visible Light Photo-induced Polymerization," *J. Imaging Science and Technology*, Vol. 37, No. 2, March/April 1993, pp. 208–210.

Dyes known to be useful in sensitizing iodonium salts include acridine orange, acridine yellow, benzoflavin, phosphine R, Michler's Ketone, hematoporphyrin and setoflavin T.

M. Kawabata and Y. Takimoto disclose the use of an argon ion laser beam to cure a three-component system with visible light in "Photoinitiation Systems Comprises of Dyes and Radical Precursors," *Journal of Photopolymer Science and Technology*, Vol. 1, No. 2, 1988, pp. 222–227. The system comprises a dye, diphenyliodonium chloride, and N-phenylglycine. The photoinitiators were dissolved in a solvent and mixed with a solution of an acrylic polymer and a polyfunctional acrylic monomer. The weight ratio of the polymer, monomer, and dye was 100:100:6. An argon ion laser scanning system was used for image formation. The wavelength was 488 nm, the beam diameter 25 micrometers, and the laser power was 0.1, W, 0.2 W, or 0.3 W. Application of the laser light was found to cause the polymer solution to gel. By extension, a similar system could be used to cure a resin on a reinforcement member such as a woven fabric. Application of laser light in specific patterns, as is well known in the art, could be used to provide patterns and textures in a papermaking fabric that were previously unknown or difficult to achieve.

While curing of the resin as described above has generally been presented in terms analogous to negative photoresist methods, wherein light hardens the exposed resin, positive photoresist systems are also within the scope of the present invention. Positive photoresist systems typically employ a non-photosensitive base resin such as a novolac resin and a photosensitive dissolution inhibitor, typically diazonaphthoquinone or tri-diazonaphthoquinone sulfonyl benzophenone. Upon exposure to light, the dissolution inhibitor is attacked. Upon subsequent contact of the resin with a solvent, the photoexposed regions are dissolved, but the masked areas with active dissolution inhibitors remain relatively intact. The solvent can be aqueous alkaline solutions, which can attack hydrophilic novolac resins (the attack is impeded by the hydrophobic inhibitor) or other solvents known in the art. The dissolution inhibitor can make the resin more hydrophobic and thus prevent attack. In a related embodiment, the positive photoresist resin can comprise a polysulfone, such as polybutene-1-sulfone, which breaks down upon exposure to radiation such as an electron beam, allowing treatment with a subsequent "developer" to dissolved the phototreated polymer. The base resin in the positive photoresist method can be fully cured by heating or by other methods known in the art. Some systems are adapted for use with excimers, such as DHK-1200 (Dongjin Semichem, Korea), a positive type photoresist adapted for KrF excimers.

Three-dimensional UV curing can also be practiced. For example, Lighthouse TM VL Curing Systems by UV Process Supply, Inc. (Chicago, Ill.) are UV curing systems designed for 3-D liquid and powder coating UV curing applications, which can be used according to the present invention to provide asymmetrical structures in a photocured resin residing on a substrate.

Textured polymeric fabrics can also be formed by a variety of methods for assembling three-dimensional structures in the art of rapid prototyping, including selective laser sintering, stereolithography, and RTV (room temperature vulcanization) molding, all of which are services available from Accelerated Technologies, Inc. (Austin, Tex.). A related method is Fuse Deposition Modeling, in which a molten stream of a polymer is selectively laid down in thin layers according to a predetermined pattern to build a complex three-dimensional structure. Fuse Deposition Modeling is offered by Conceptual Reality L. L. C. (Walled Lake, Mich.). The material made in this manner may be used as is, or after joining to a reinforcing base layer or other components to form a composite fabric. Rapid prototyping may be done with a reinforcing fabric or mesh already present, as well.

The deflection member need not be made by photocuring or by patterned curing of resin, but can be made in a wide variety of methods known in the art. Machine tooling of polymer belts can be applied to engrave specific patterns into a belt to create a deflection member or a textured shoe belt. Thus, metal or hardened polymeric tools can act directly on an initially flat surface to impart engraving marks. Likewise, an initially flat polymeric belt can be rendered textured by thermal molding against a textured surface, embossing between one or more textured surfaces, laser engraving, ablation, ultrasonic drilling or molding, and the like. The deflection member can also be a drilled nonwoven web such as the web of Hans Albert disclosed in U.S. Pat. No. 4,541,895, issued Sep. 17, 1985 previously incorporated by reference. One source for laser drilling to provide textured deflection members is Laserworks, a division of Stencil Aire, Inc., (Green Lake, Wis.).

A deflection member can also be formed by molding or casting to have a texture, which may subsequently be modified by tooling, engraving, or other methods to further enhance the texture. Likewise, a resin may be molded into a desired shape by contact with a molding surface, as disclosed in WO 00/14328 by R. Ampulski, published Mar. 16, 2000. The method described by Ampulski comprises depositing a flowable resinous material onto a patterned molding surface; continuously moving the molding surface and a reinforcing structure (a base fabric) at a transport velocity such that at least a portion of the reinforcing structure is in a face-to-face relationship with a portion of the molding surface; applying a fluid pressure differential to transfer the flowable resinous material from the molding surface onto the reinforcing structure and causing the flowable resinous material and the reinforcing structure to join together; and solidifying the resinous material thereby forming the resinous framework joined to the reinforcing structure. Many other variations of molding processes are also within the scope of the present invention. For example, the resin may be partially cured or hardened prior to contact with the reinforcing structure, or the reinforcing structure may be in contact with the molding surface prior to application of the resinous material, or curing may begin prior to application of the pressure differential, and so forth. Curing of the resin during molding (as in any other application involving curing of a resin) may be achieved by heating, actinic radiation, visible light, electron beam radiation, gamma radiation, microwave radiation, radiofrequency radiation, application of a reactive chemical in the gaseous or liquid phase, or by crosslinking initiated by addition of a chemical initiator to the resin shortly prior to application of the resin to the molding surface (e.g., mixing of a two-component epoxy system).

The above methods, including those made by visible light curing and other radiative curing techniques, can also be applied to the production of fabrics having reinforcing piles, as described in U.S. Pat. No. 6,110,324, issued Aug. 29, 2000 to Trokhan et al., herein incorporated by reference in a manner consistent herewith, or for the production of other fabric structures known in the art.

Other Embodiments of the Deflection Member

The deflection member may be made in several other embodiments. For example, it is not necessary that the deflection member utilize a reinforcing structure. If desired, the deflection member may be made of the photosensitive resin, described above, cast on a surface not having a reinforcing structure. Thus, a deflection member can comprise a single material cast to form a network of raised elements with deflection conduits therebetween, such as apertures that render the deflection member liquid permeable, or sealed depressed regions that provide deflection conduits in an impermeable deflection member.

The deflection members described herein can be substantially impermeable to water. By "substantially impermeable," it is meant that the deflection member transmits no water through capillaries having any one dimension of 50 microns or greater. In one embodiment, the deflection member is substantially impervious to liquid flow but pervious to gas flow. For example, a hydrophobic web with sufficiently small pores can substantially hinder the flow of water through the web while permitting gas transport. Thus, the web can have less than 5% open area and can have an average pore size less than 20 microns, more specifically less than 10 microns, and most specifically from about 1 to 30 microns.

Polyurethane resins and foams have also successfully been used to render belts impermeable, as illustrated by the commercially available Trans-belt, an impermeable belt manufactured by Albany International of Albany, N.Y. Alternatively, rubber and silicone coatings may be utilized to render the belt impervious. The material which renders the belt impervious may be applied by any known means such as printing, spraying, blade coating, other coating technologies, or impregnating. Impregnating can be done by immersing the belt in a bath of the substance or by forcing the substance into the voids of the belt at an elevated hydraulic pressure (i.e., a pressure gradient drives the substance into the belt).

Suitably, the deflection member according to the present invention may be made with a texture comprising semi-continuous, continuous or discrete patterns or combinations thereof in the X-Y plane of the belt. In producing an impermeable deflection member, a permeable papermaking belt having outwardly extending raised elements and openings therebetween can be rendered impermeable. For example, a permeable deflection member according to other embodiments of the present invention can be used, as well as the belt disclosed in U.S. Pat. No. 4,239,065, issued to Trokhan, or a Spectra Membrane® fabric sold by Voith Fabrics (Raleigh, N.C., formerly sold by the Scapa Group of England). The belt is immersed in liquid resin to a depth which does not immerse the outwardly extending raised elements of the belt. The resin is cured as described above rendering the belt impermeable, but leaving the pattern of raised elements so that the impermeable deflection member retains its original texture. More generally, the openings between the raised elements are sealed with cured resin, a film, or other materials while preserving at least a portion of the texture of the web contacting surface of the fabric, such that deflection conduits are defined between the raised elements.

In another embodiment, after a belt has been rendered impermeable by any means or material, additional texture may be imparted to form a deflection member by casting photosensitive resin thereon, as described above. Alternatively, the texture may be provided by stitching, or selectively removing material from the belt. The texture, without regard to how it is imparted or the belt is made, may comprise any desired X-Y pattern. The texture may be discontinuous, semi-continuous, or continuous.

One embodiment utilizes an impermeable conventional felt. The impermeable felt has material applied to the back side which renders the felt impermeable. Then, the top side of the felt is provided with knuckles by stitching the knuckles into the sheet side thereof. In this manner, an impermeable felt having knuckles which imparts texture and also absorbs water from the paper is provided. As used herein, knuckles refer to a pattern raised above the plane of the sheet side of the deflection member and extending outwardly therefrom.

In one embodiment, the deflection member comprises two or more sets of deformation elements (e.g., the UV-cured resin elements on a woven base fabric) residing in a common plane or multiple planes wherein the elastic properties of the deformation elements differ substantially. The domes formed by deformation of a web into the deflection conduits between or in the deformation elements will therefore differ in properties (height, thickness, strength, etc.) because of the differing mechanical response of the deformation elements. For example, two UV-curable resins could be applied in discrete zones on a fabric, such as in two separate steps, with one resin curing to be substantially rigid and the other curing to a substantially elastomeric state or substantially deformable state. Alternatively, a visible-light resin could be cured in a pattern applied by a computer-controlled laser source, while a second UV-curable resin was cured by traditional methods, producing a fabric with two patterns of cured resins cured by visible-light and UV-light, respectively. The two patterns may have different heights, different compressive properties (e.g., differing elastic moduli), or different thermal conductivities. Likewise, the support structures for the deformation elements may have different material properties to allow some regions of the deflection member to deform more than others when in a nip. With two or more regions of the deflection member having different material properties, pressing the deflection member against a web in a nip can yield one set of depressions or elevated regions in the web having greater depth and clarity and different material properties than the set of depressions or sheet markings formed by deformation elements having a second set of material properties. The combination of two or more regions of deflection elements or support elements on the deflection member having different material properties (compressibility or height, for example) with a press nip optionally having differential velocity contact opens the possibility for a wide range of material properties and textures that can be imparted to tissue webs.

Papermaking belts or fabrics useful for the method of Ampulski that could be modified to have two or more resin-based or thermoplastic deformation elements include those of U.S. Pat. No. 5,098,522, "Papermaking Belt and Method of Making the Same Using a Textured Casting Surface," issued to J. A. Smurkoski et al., Mar. 24, 1992; U.S. Pat. No. 5,275,700, issued Jan. 4, 1994 to Trokhan; U.S. Pat. No. 4,529,480, issued to P. D. Trokhan, Jul. 16, 1985; U.S. Pat. No. 4,637,859, issued to P. D. Trokhan, Jan. 20, 1987; U.S. Pat. No. 4,514,345, issued to Johnson et al., Apr. 30, 1985, and the like. Voit's Ribbed Spectra® fabrics and other Voith fabrics can also be used, including those disclosed in U.S. Pat. No. 5,508,095, "Papermachine Clothing," issued to A. Allum et al., Apr. 16, 1996, or other fabrics with extruded elevated thermoplastic or resin members adhered to a woven base fabric. Other fabric concepts can also be used, including the nonwoven molding substrates of Lindsay and Burazin in U.S. Pat. No. 6,080,691, issued Jun. 27, 2000, previously incorporated by reference.

In an alternative embodiment, the deflection member is joined to the deformable backing fabric, yielding a composite deflection member. For example, a papermakers felt can be impregnated with a photocurable resin (or, more generally, a radiation curable resin) on the upper surface, which is then cured in a pattern to form cured raised elements and deflection conduits where the resin was not cured but subsequently removed, as by washing with a solvent. Principles for production of composite imprinting elements are disclosed in U.S. Pat. No. 5,817,377, "Method of Applying a Curable Resin to a Substrate for Use in Papermaking," issued Oct. 6, 1998 to Trokhan et al., and U.S. Pat. No. 5,871,887, "Web Patterning Apparatus Comprising a Felt Layer and a Photosensitive Resin Layer," issued Feb. 16, 1999 to Trokhan et al., both of which are herein incorporated by reference.

Though photocurable resins are preferred, radiation curable resins in general can be used. Radiation curable resins include resin systems (including initiators) that can be cured by application of radiation such as gamma rays, an electron beam, actinic light, visible light. Resin systems curable by any of these types of radiation are known to those skilled in the art and can be adapted for the present invention.

The texture from the deflection member can interact effectively with the texture of yet another web-contacting element to produce a texture more complex or beneficial to material properties than could be obtained with a single fabric. The other web-contacting element with whose texture the texture of the deflection member can interact could be the deformable carrier fabric or a subsequent through-drying or imprinting fabric or a textured roll such as a drying drum or an embossing roll. In one embodiment, however, the other web-contacting element is not an embossing roll, and more specifically is an element that imparts a degree of texture to the web before it has been dried above about 70% solids, more specifically above about 80% solids, and most specifically before it has reached final dryness (typically over 90% such as about 95–98% dryness).

The deflection member of the present invention may also comprise two or more reinforcing layers (i.e., the base fabric may comprise two or more layers of material, such as separately woven or interwoven layers), wherein at least one subset of the raised elements join at least two of the two or more reinforcing layers together. Such embodiments may follow the principles and structures disclosed by Stelljes, Jr. et al. in U.S. Pat. No. 5,496,624, "Multiple Layer Papermaking Belt Providing Improved Fiber Support for Cellulosic Fibrous Structures, and Cellulosic Fibrous Structures Produced Thereby," issued Mar. 5, 1996, herein incorporated by reference.

The deflection member may further comprise a fine texture superimposed on the individual raised elements. For example, ridges, microprotrusions, and indentations can be placed on the surfaces of the raised elements. In particular, the raised elements can also comprise "synclines" as defined in U.S. Pat. No. 6,117,270, issued Sep. 12, 2000 to Trokhan, herein incorporated by reference in a manner consistent herewith. In general, a syncline is a blind hole, fissure, chasm, or notch in the framework of raised elements, in contrast to a deflection conduit which provides an open hole exposing the underlying base fabric. In addition to the holes, fissures, chasms, or notches of U.S. Pat. No. 6,117,270, the deflection members of the present invention can be modified to have "anti-synclines," which are ridges, bumps, and protrusions on the framework of raised elements that can impart "negative" versions of the small-scale texture that would have been imparted by similarly patterned synclines (imparting indentations to the paper in contrast to the raised bumps that synclines would impart). Any of the syncline patterns or principles for formation of syncline patterns described in U.S. Pat. No. 6,117,270 can generally be adapted for anti-synclines as well. In one embodiment, the deflection member comprises a first pattern of synclines and a second pattern of anti-synclines. The characteristic depth of an anti-syncline can be equal to, greater than, or smaller than suitable depths for synclines, and when both synclines and anti-synclines are present, the characteristic depths can be the same or substantially different.

The deflection member can be treated in a variety of ways to improve surface properties, frictional properties, wear resistance, and the like. Application of silicone compounds or other release agents to the surface of the deflection member can be done. The deflection member can also be treated with plasma, corona discharge, or chemical means to provide desired functional groups on the surface.

Other Embodiments for Tissue

Many other treatments and processes known in the art can be applied to the tissue web of the present invention. For example, once the web has been transferred to the deflection member after the compressive nip, the web may be further molded against the deflection member by application of a flexible sheet of material on the exposed surface of the web (thus sandwiching the web between the deflection member and the flexible sheet of material), wherein the flexible sheet has a lower air permeability than the deflection member, followed by application of differential air pressure across the combined flexible sheet, paper web, and deflection member, such that the highest air pressure is against the flexible sheet and the lowest air pressure is against the deflection member. In this manner, the air pressure gradient will press against the less permeable flexible sheet and cause it to urge the web to further conform to the topography of the deflection member, thus improving the molding of the web. The flexible sheet can be elastic in the machine direction or in both the machine direction and cross direction, to better conform to the topography of the deflection member under differential air pressure. The molding of a web by application of elevated air pressure against the flexible sheet of material is more fully described in U.S. Pat. No. 5,893,965, issued Apr. 13, 1999 to Trokhan and Vitenberg, previously incorporated by reference. One useful flexible sheet for such purposes is the EXXTRAFLEX® film type "EXX 7 A-1" (having thickness of about 1.5 mils) available from Exxon Chemical America's Film Division's plant, Lake Zurich, Ill., Exxon Corporation (New Jersey Corporation), Flemington, N. J. 08822. Further, U.S. Pat. No. 5,518,801 issued May 21, 1996 to Chappell et al. and incorporated by reference herein, discloses a web material that exhibits an elastic-like behavior along at least one axis when subjected to an applied and subsequently released elongation. The flexible sheet can be a deformable non-resilient sheet loosely maintained in a proximate relation to the deflection member and the web residing thereon such that when elevated air pressure is applied to the flexible sheet, the sheet is capable of approximating the geometry of the deflection conduits of the belt deflection member.

Elevated portions of the web on either side of the web (tops of domes or the pattern densified network) can be selectively treated with chemical agents such as starch, sizing material, waxes, and the like to obtain improved physical properties of the product. Means such as gravure printing, size press coating of a liquid, and the like can be used.

The wet or dry web can also be impregnated with a solution, hot melt, or slurry. One useful method for impregnation of a moist web is the Hydra-Sizer® system, produced by Black Clawson Corp., Watertown, N.Y., as described in "New Technology to Apply Starch and Other Additives," Pulp and Paper Canada, 100(2): T42-T44 (February. 1999). This system consists of a die, an adjustable support structure, a catch pan, and an additive supply system. A thin curtain of descending liquid or slurry is created which contacts the moving web beneath it. Wide ranges of applied doses of the coating material are said to be achievable with good runnability. The system can also be applied to curtain coat a relatively dry web, such as a web just before or after creping.

The elevated regions or depressed regions so produced can be provided with absorbency aids, as disclosed in U.S. Pat. No. 5,840,403, "Multi-Elevational Tissue Paper Containing Selectively Disposed Chemical Papermaking Additive," issued Nov. 24, 1998 to Trokhan et al., the parts of which that are non-contradictory with the instant specification being herein incorporated by reference. Elevated portions of the web can also be provided with hydrophobic material to improve the dry feel of the wetted article against the skin, as disclosed in commonly owned U.S. Pat. No. 5,990,377, "Dual-Zoned Absorbent Webs," issued Nov. 23, 1999 herein incorporated by reference. For example, gravure printing of quaternary ammonium-based debonder agents or softening agents can be used at a sufficiently low nip pressure to restrict absorption of the agent so applied to primarily the uppermost portions of the textured web surface. Skin care agents can likewise be printed or applied to the uppermost portions of the web surface, or applied uniformly or in a pattern on the web surface. Skin care agents can include emollients, aloe vera, petrolatum, lotions, enzyme inhibitors, and other known therapeutic agents such as, for example, the oxothizolidine-carboxylic acid derivatives of U.S. Pat. No. 6,004,543, issued Dec. 21, 1999 to Galey et al.; the silicone salicylate esters of U.S. Pat. No. 6,004,542, issued Dec. 21, 1992 to O'Lenick; or anti-allergenic compounds, antiinflammatory compounds, or related topical compounds mentioned in U.S. Pat. No. 5,922,335, issued Jul. 13, 1999 to Ptchelintsev, herein incorporated by reference, including ascorbyl-phosphoryl-cholesterol compounds.

The paper webs of the present invention can be used in many forms, including multilayered structures, composite assemblies, and the like. The web may also be used as a basesheet for construction of wet wipes, paper towels, and other articles. For example, the web may be impregnated with a latex and then creped. Specifically, the web may be used for double print-creping as described in U.S. Pat. No. 3,879,257, "Absorbent Unitary Laminate-Like Fibrous Webs and Method for Producing Them," issued Apr. 22, 1975 to Gentile et al., herein incorporated by reference. The web may also be treated with wet strength resins on one side prior to contacting a Yankee dryer, wherein the wet strength resin assists in creping and provides improved temporary wet strength to the web, as disclosed in U.S. Pat. No.

5,993,602, "Method of Applying Permanent Wet Strength Agents to Impart Temporary Wet Strength in Absorbent Tissue Structures," issued Nov. 30, 1999 to Smith et al.

In one embodiment, the paper webs of the present invention are laminated with additional plies of tissue or layers of nonwoven materials such as spunbond or meltblown webs, or other synthetic or natural materials. Lamination can be achieved through crimping, perf-embossing, adhesive attachment, etc. The adhesive can comprise natural materials such as starch, gum arabic, and the like, or adhesives containing natural fibers, exemplified by U.S. Pat. No. 5,958,558, "Corrugating Adhesives Employing Tapioca Fiber," issued to J. E. T. Giesfeldt and J. R. Wallace, Sep. 28, 1999.

Laminates formed with the webs of the present invention can be produced by any method known in the art, including lamination with thermoplastic adhesives to a film as disclosed in U.S. Pat. No. 5,958,178, issued Sep. 29, 1999 to P. Bartsch and H. J. Mueller.

In another embodiment, the webs of the present invention are used to produce wet wipes such as premoistened bath tissue. For good dispersibility and good wet strength, binders that are sensitive to ion concentration can be used such that the binder provides integrity in a wetting solution that is high in ion concentration, but loses strength when placed in ordinary tap water because of a lower ion strength. Examples of suitable binders and product designs are disclosed in U.S. Pat. No. 5,972,805, "Ion Sensitive Polymeric Materials," issued Oct. 26, 1999 to Pomplun et al.; U.S. Pat. No. 5,935,880, "Dispersible Nonwoven Fabric and Method of Making Same," issued Aug. 10, 1999 to Wang et al.; U.S. Pat. No. 5,384,189, "Water-Decomposable Non-Woven Fabric," issued Jan. 24,1995 to Kuroda et al.; U.S. Pat. No. 5,317,063, "Water-Soluble Polymer Sensitive to Salt," issued May. 31, 1994 to Komatsu et al.; U.S. Pat. No. 5,312,883, "Water-Soluble Polymer Sensitive to Salt," issued May. 17, 1994 to Komatsu et al.; U.S. Pat. No. 4,164,595, "Premoistened Flushable Wiper," issued Aug. 14,1979 to Adams et al.; and U.S. Pat. No. 4,362,781, "Flushable Premoistened Wiper," issued Dec. 7, 1982 to Anderson; all of which are herein incorporated by reference. Related water dispersible binder systems include the cellulose sulfates of Varona in U.S. Pat. No. 4,419,403, "Water Dispersible Premoistened Wiper," issued Dec. 6, 1983.

U.S. Pat. No. 4,537,807, "Binder for Pre-Moistened Paper Products," issued Aug. 27, 1985 to Chan et al., and herein incorporated by reference, discloses a premoistened towelette or wiper type paper product having high wet strength when stored in an acidic pH medium and during usage and lower wet strength when immersed in a neutral or alkaline pH medium for disposal in conventional sewage systems comprising a non-woven fibrous web. The nonwoven web is treated with a polymeric binder comprising a copolymer of glyoxal and polyvinyl alcohol which is said to maintain high wet strength when stored for sustained periods of time in acidic pH wetting medium conventionally used for external cleansing of the human body and during usage and yet which will readily break-up during flushing. Chan et al. also teach a method of treating non-woven fibrous webs with the glyoxalated polyvinyl alcohol copolymer binder and drying prior to wetting in an acidic, e.g. boric acid medium. Such systems can be applied to the webs of the present invention as well.

After formation of the embryonic web and prior to contact with the deflection member, a variety of other treatments can be applied to the web to improve processability or to add desirable properties. For example, enhanced dewatering of the embryonic web can be performed by nonthermal or thermal means to elevated the web consistency to levels such as 20% of greater, more specifically 25% or greater, more specifically still about 30% or greater, and most specifically about 40% or greater, with an exemplary range of from about 37% to 50% or from 42% to about 55%. Dewatering can be substantially nonthermal, particularly fiber consistencies less than about 35%. Nonthermal dewatering means can include application of vacuum or differential gas pressure to drive liquid out, or applied capillary pressure across the web to pull liquid out. Useful methods with differential gas pressure include the use of air presses as disclosed in commonly owned U.S. patent applications Ser. No. 08/647,508, "Method and Apparatus for Making Soft Tissue", filed May 14, 1996; Ser. No. 09/201100, "Apparatus and Method for Dewatering a Paper Web," filed Nov. 30, 1998, and Ser. No. 09/298250, "Air Press For Dewatering A Wet Web," filed Apr. 23, 1999. Also relevant are the paper machine disclosed in U.S. Pat. No. 5,230,776 issued Jul. 27, 1993 to I.A. Andersson et al.; the capillary dewatering techniques disclosed in U.S. Pat. Nos. 5,598,643 issued Feb. 4, 1997 and 4,556,450 issued Dec. 3, 1985, both to S. C. Chuang et al.; and the dewatering concepts disclosed by J. D. Lindsay in "Displacement Dewatering to Maintain Bulk," Paperija Puu, 74(3): 232–242 (1992).

The webs of the present invention may be subsequently treated in any way known in the art. The web may be provided with particles or pigments such as superabsorbent particles, mineral fillers, pharmaceutical substances, odor control agents, and the like, by methods such as coating with a slurry, electrostatic adhesion, adhesive attachment, by application of particles to the web or to the elevated or depressed regions of the web, including application of fine particulates by an ion blast technique as described in WO 00/003092, "Method for Making Paper, Assembly for Implementing the Method and Paper Product Produced by the Method," by V. Nissinen et al., published Jan. 20, 2000, and the like. The web may also be calendered, embossed, slit, rewet, moistened for use as a wet wipe, impregnated with thermoplastic material or resins, treated with hydrophobic matter, printed, apertured, perforated, converted to multiply assemblies, or converted to bath tissue, facial tissue, paper towels, wipers, absorbent articles, and the like.

The tissue products of the present invention can be converted in any known tissue product suitable for consumer use. Converting can comprise calendering, embossing, slitting, printing, addition of perfume, addition of lotion or emollients or health care additives such as menthol, stacking preferably cut sheets for placement in a carton or production of rolls of finished product, and final packaging of the product, including wrapping with a poly film with suitable graphics printed thereon, or incorporation into other product forms.

Layered Webs

In one embodiment, the papermaking web itself comprises multiple layers having different fibers or chemical additives. The tissue of the present invention can be produced in layered form, wherein a plurality of furnishes are used to produce an embryonic paper web. This can be achieved by employing a single headbox with two or more strata, or by employing two or more headboxes depositing different furnishes in series on a single forming fabric, or by employing two or more headboxes each depositing a furnish on a separate forming fabric to form an embryonic web followed by joining ("couching") the embryonic webs together to form a multi-layered web. The distinct furnishes may be differentiated by at least one of consistency, fiber species (e.g., eucalyptus vs. softwood, or southern pine versus northern pine), fiber length, bleaching method (e.g., peroxide bleaching vs. chlorine dioxide bleaching), pulping method (e.g., kraft versus sulfite pulping, or BCTMP vs. kraft), degree of refining, pH, zeta potential, color, Canadian Standard Freeness (CSF), fines content, size distribution, synthetic fiber content (e.g., one layer having 10% polyolefin fibers or bicomponent fibers of denier less than 6), and the presence of additives such as fillers (e.g., $CaCO_3$, talc, zeolites, mica, kaolin, plastic particles such as ground polyethylene, and the like) wet strength agents, starch, dry strength additives, antimicrobial additives, odor control agents, chelating agents, chemical debonders, quaternary ammonia compounds, viscosity modifiers (e.g., CMC, polyethylene oxide, guar gum, xanthan gum, mucilage, okra extract, and the like), silicone compounds, fluorinated polymers, optical brighteners, and the like. For example, in U.S. Pat. No. 5,981,044, issued Nov. 9, 1999, Phan et al. disclose the use of chemical softeners that are selectively distributed in the outer layers of the tissue, as can be practiced in the present invention.

Stratified headboxes for producing multilayered webs are described in U.S. Pat. No. 4,445,974, issued May 1, 1984, to Stenberg; U.S. Pat. No. 3,923,593, issued Dec. 2, 1975 to Verseput; U.S. Pat. No. 3,225,074 issued to Salomon et al., and U.S. Pat. No. 4,070,238, issued Jan. 24, 1978 to Wahren. By way of example, useful headboxes can include a four-layer Beloit (Beloit, Wisc.) Concept III headbox or a Voith Sulzer (Ravensburg, Germany) ModuleJet® headbox in multilayer mode.

Principles for stratifying the web are taught by Kearney and Wells in U.S. Pat. No. 4,225,382, issued Sep. 30, 1980, which discloses the use of two or more layers to form ply-separable tissue. In one embodiment, a first and second layer are provided from slurry streams differing in consistency. In another embodiment, two well-bonded layers are separated by an interior barrier layer to enhance ply separability. Dunning in U.S. Pat. No. 4,166,001, issued Aug. 28, 1979 also discloses a layered tissue with strength agents in the outer layers of the web with debonders in the inner layer. Taking a different approach aimed at improving tactile properties, Carstens in U.S. Pat. No. 4,300,981, issued Nov. 17, 1981, discloses a layered web with relatively short fibers on one or more outer surfaces of the tissue web. A layered web with shorter fibers on an outer surface and longer fibers for strength being in another layer is also disclosed by Morgan and Rich in U.S. Pat. No. 3,994,771 issued Nov. 30, 1976. Similar teaching are found in U.S. Pat. No. 4,112,167 issued Sep. 5, 1978 to Dake et al. and in U.S. Pat. No. U.S. Pat. No. 5,932,068, issued Aug. 3, 1999 to Farrington, Jr. et al. issued to Farrington et al., herein incorporated by reference. Other principles for layered web production are also disclosed in U.S. Pat. No. 3,598,696 issued to Beck and U.S. Pat. No. 3,471,367, issued to Chupka.

In one embodiment, an initial pulp suspension is fractionated into two or more fractions differing in fiber properties, such as mean fiber length, percentage of fines, percentage of vessel elements, and the like. Fractionation can be achieved by any means known in the art, including screens, filters, centrifuges, hydrocyclones, application of ultrasonic fields, electrophoresis, passage of a suspension through spiral tubing or rotating disks, and the like. In a related embodiment, the papermaking web itself comprises multiple layers having different fibers or chemical additives. Tissue in layered form can be produced with a stratified headbox or by combining two or more moist webs from separate headboxes.

The layered sheet may have two, three, four, or more layers. A two-layered sheet may have splits based on layer basis weights such that the lighter layer has a mass of about 5% or more of the basis weight of the overall web, or about 10% or more, 20% or more, 30% or more, 40% or more, or about 50%. Exemplary weight percent splits for a three-layer web include 20%/20%/60%; 20%/60%/20%; 37.5%/25%/37.5%.; 10%/50%/40%; 40%/20%/40%; and approximately equal splits for each layer. In one embodiment, the ratio of the basis weight of an outer layer to an inner layer can be from about 0.1 to about 5; more specifically from about 0.2 to 3, and more specifically still from about 0.5 to about 1.5.

Definitions and Test Methods

As used herein, a material is said to be deformable" if the thickness of the material between parallel platens at a compressive load of 100 kPa is at least 5% greater than the thickness of the material between parallel platens at a compressive load of 1000 kPa. In some embodiment, the raised elements of the deflection member are deformable, or the deflection member itself is deformable. However, any one or all of the deflection member, the raised elements or the base fabric can be non-deformable.

"Papermaking fibers," as used herein, include all known cellulosic fibers or fiber mixes comprising cellulosic fibers. Fibers suitable for making the webs of this invention comprise any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including kraft, sulfite, high-yield pulping methods and other known pulping methods. Fibers prepared from organosolv pulping methods can also be used, including the fibers and methods disclosed in U.S. Pat. No. 4,793,898, issued Dec. 27, 1988 to Laamanen et al.; U.S. Pat. No. 4,594,130, issued Jun. 10, 1986 to Chang et al.; and U.S. Pat. No. 3,585,104. Useful fibers can also be produced by anthraquinone pulping, exemplified by U.S. Pat. No. 5,595,628, issued Jan. 21, 1997 to Gordon et al. A portion of the fibers, such as up to 50% or less by dry weight, or from about 5% to about 30% by dry weight, can be synthetic fibers such as rayon, polyolefin fibers, polyester fibers, bicomponent sheath-core fibers, and the like. An exemplary polyethylene fiber is Pulpex®, available from Hercules, Inc. (Wilmington, Del.).

Synthetic cellulose fiber types include rayon in all its varieties and other fibers derived from viscose or chemically modified cellulose. Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500.

As used herein, the term "cellulosic" is meant to include any material having cellulose as a major constituent, and specifically comprising at least 50 percent by weight cellulose or a cellulose derivative. Thus, the term includes cotton, typical wood pulps, nonwoody cellulosic fibers, cellulose acetate, cellulose triacetate, rayon, thermomechanical wood pulp, chemical wood pulp, debonded chemical wood pulp, milkweed, or bacterial cellulose.

As used herein, the "wet:dry ratio" is the ratio of the geometric mean wet tensile strength divided by the geometric mean dry tensile strength. Geometric mean tensile strength (GMT) is the square root of the product of the machine direction tensile strength and the cross-machine direction tensile strength of the web. Unless otherwise indicated, the term "tensile strength" means "geometric mean tensile strength." The absorbent webs used in the present invention can have a wet:dry ratio of about 0.1 or greater and more specifically about 0.2 or greater. Tensile strength can be measured using an Instron tensile tester using a 3-inch jaw width (sample width), a jaw span of 2 inches (gauge length), and a crosshead speed of 25.4 centimeters per minute after maintaining the sample under TAPPI conditions for 4 hours before testing. The absorbent webs of the present invention can have a minimum absolute ratio of dry tensile strength to basis weight of about 0.01 gram/gsm, specifically about 0.05 grams/gsm, more specifically about 0.2 grams/gsm, more specifically still about 1 gram/gsm and most specifically from about 2 grams/gsm to about 50 grams/gsm.

As used herein, "bulk" and "density," unless otherwise specified, are based on an oven-dry mass of a sample and a thickness measurement made at a load of 0.34 kPa (0.05 psi) with a 7.62-cm (three-inch) diameter circular platen. Details for thickness measurements and other forms of bulk are described hereafter.

As used herein, the term "hydrophobic" refers to a material having a contact angle of water in air of at least 90 degrees. In contrast, as used herein, the term "hydrophilic" refers to a material having a contact angle of water in air of less than 90 degrees.

As used herein, the term "surfactant" includes a single surfactant or a mixture of two or more surfactants. If a mixture of two or more surfactants is employed, the surfactants may be selected from the same or different classes, provided only that the surfactants present in the mixture are compatible with each other. In general, the surfactant can be any surfactant known to those having ordinary skill in the art, including anionic, cationic, nonionic and amphoteric surfactants. Examples of anionic surfactants include, among others, linear and branched-chain sodium alkylbenzenesulfonates; linear and branched-chain alkyl sulfates; linear and branched-chain alkyl ethoxy sulfates; and silicone phosphate esters, silicone sulfates, and silicone carboxylates such as those manufactured by Lambent Technologies, located in Norcross, Georgia. Cationic surfactants include, by way of illustration, tallow trimethylammonium chloride and, more generally, silicone amides, silicone amido quaternary amines, and silicone imidazoline quaternary amines. Examples of nonionic surfactants, include, again by way of illustration only, alkyl polyethoxylates; polyethoxylated alkylphenols; fatty acid ethanol amides; dimethicone copolyol esters, dimethiconol esters, and dimethicone copolyols such as those manufactured by Lambent Technologies ; and complex polymers of ethylene oxide, propylene oxide, and alcohols. One exemplary class of amphoteric surfactants are the silicone amphoterics manufactured by Lambent Technologies (Norcross, Ga.).

Thickness and Bulk Measurement

Thickness and other geometrical features of the web at a microscopic level can be determined using computer-assisted image analysis of microtomed plastic sections of the webs, imaged by polarized light optical microscopy. Thin optical sections provide a 2-dimensional field suitable for analysis. For example, microtomed sections can be prepared by infiltrating the dry webs in silicone molds with low-viscosity epoxy resin available from Ladd Research Industries, Ltd., Burlington, Vermont. The resin is polymerized for 36 hours at 65° C. Ten micrometer thick sections are cut from each block using a steel knife microtome, cover-slipped on a glass slide then examined using polarized light optical microscopy. Randomly selected image fields of each material section are digitized from the microscope using a Dage MTI VE 1000 CCD monochrome camera, and analyzed using a Sun Sparc20 workstation running PGT IMIX Feature Analysis software, available from Princeton Gamma Tech. Inc., 1200 State Rd., Princeton N.J. Image magnification can be 10×, with image calibration is performed using a certified stage micrometer (Graticules Ltd., Part #S8 McCrone Associates), divided into 10 micrometer increments. The polarized light images are binarized and processed to fill holes or inclusion voids in the fibers.

The microtomed cross-sections of the web can then be analyzed using the principles described in U.S. Pat. No. 5,904,811, issued May. 18, 1999 to Ampulski et al., previously incorporated by reference, to obtain specific parameters such as P, K, and T as shown in FIG. 3A.

"Macro-caliper" as used herein means the macroscopic thickness of the sample at an applied pressure of about 15 g/square cm (0.21 psi). The sample is placed on a horizontal flat surface and confined between the flat surface and a load foot having a horizontal loading surface, where the load foot loading surface has a circular surface area of about 3.14 square inches and applies a confining pressure of about 15 g/square cm (0.21 psi) to the sample. The macro-caliper is the resulting gap between the flat surface and the load foot loading surface. The macro-caliper is an average of at least five measurements. Thickness measurements of samples are made in a TAPPI-conditioned room (50% relative humidity and 23° C.) after conditioning for four hours. Samples should be essentially flat and uniform under the area of the contacting platen.

For macroscopic thickness measurement to give an overall thickness of the sheet for use in calculating the "bulk" of the web, as used herein, the thickness measurement is conducted on a stack of five sheets at a load of 0.05 psi using a three-inch diameter circular platen to apply the load. Samples are measured after conditioned for four hours in a TAPPI-conditioned room. The sheets rest beneath the flat platen and above a flat surface parallel to the platen. The platen is connected to a thickness gauge such as a Mitutoyo digital gauge which senses the displacement of the platen caused by the presence of the sheets. Samples should be essentially flat and uniform under the contacting platen. Bulk is calculated by dividing the thickness of five sheets by the basis weight of the five sheets (conditioned mass of the stack of five sheets divided by the area occupied by the stack, which is the area of a single sheet). Bulk is expressed as volume per unit mass in cc/g and density is the inverse, g/cc.

One alternative measure of bulk is the "Ampulski Bulk," which, as used herein, uses the "macro-caliper" measurement described above to obtain the bulk at a load of 15 g/cm$^2$ (0.21 psi) with a platen having a circular surface area of about 3.14 square inches.

As used herein, "Wet Bulk" is based on a caliper measurement of a stack of five sheets of a sample according to the definition of bulk above (at 0.05 psi), except that the conditioned sample is then uniformly misted with deionized water until the moistened mass of the sample is 250% of the dry mass of the sample (i.e., the added mass of the moisture is 150% of the dry sample weight) and then measured for thickness. If the sample cannot absorb and retain enough moisture from misting to increase the mass by 150%, then the highest level of achievable moisture add-on below 150% but still above 100% moisture add on should be used. The Wet Bulk is calculated as the thickness of the substantially planar moistened sample under a load of 0.344 kPa (0.05 psi) divided by the conditioned sample basis weight, yielding a value with units of g/cc. Absorbent fibrous structures of the present invention can have a Wet Bulk of about 4 cc/g or greater, more specifically about 6 cc/g or greater, more specifically still about 8 cc/g or greater, more specifically still about 10 cc/g or greater, and most specifically about 15 cc/g or greater, with an exemplary range of from about 6 cc/g to about 25 cc/g.

As used herein, "local thickness" refers to the distance between the two opposing surfaces of a web along a line substantially normal to both surfaces. The measurement is a reflection of the actual thickness of the web at a particular location, as opposed to the micro-caliper.

Web Stiffness

Web stiffness as used herein is defined as the slope of the tangent of the graph of force (in grams/centimeter of sample width) versus strain (cm elongation per cm of gage length). Web flexibility increases, and web stiffness decreases, as the slope of the tangent decreases. For creped samples the tangent slope is obtained at 15 g/cm force, and for non-creped samples the tangent slope is obtained at 40 g/cm force. Such data may be obtained using a Syntech Universal Testing Machine, with a cross head speed of 1 inch per minute and a sample width of about 4 inches for creped samples, and 0.1 inch per minute and a sample width of about 1 inch for non-creped handsheets. The Total Stiffness index (TS) as used herein means the geometric mean of the machine-direction tangent slope and the cross-machine-direction tangent slope. Mathematically, this is the square root of the product of the machine-direction tangent slope and cross-machine-direction tangent slope in grams per centimeter. For handsheets, only the machine direction tangent slope is measured, and the value of TS is taken to be the machine direction tangent slope. The value of TS is reported as an average of at least five measurements. TS can be normalized by Total Tensile to provide a normalized stiffness index TS/TT.

EXAMPLES

Example 1

Laserworks, a division of Stencil Aire, Inc., (Green Lake, Wis.), was commissioned to laser drill 1-millimeter thick sheets of flexible plastic (PETG) with a geometry according to the specifications of U.S. Pat. No. 4,528,239, issued Jul. 9, 1985 to Trokhan, based on FIG. 10 thereof, reproduced as FIG. 9 of the present application. The written description from the Trokhan patent reads in pertinent part:

Openings are in the form of nonregular six-sided figures. Reference letter "a" represents the angle between the two sides of an opening as illustrated, "f" the point-to-point height of an opening, "c" the CD spacing between adjacent openings, "d" the diameter of the largest circle which can be inscribed in an opening, "e" the width between flats of an opening, "g" the spacing between two adjacent openings in a direction intermediate MD and CD, and "b" the shortest distance (in either MD or CD) between the centerlines of two MD or CD adjacent openings. In this version, "a" is 135°, "c" is 0.56 millimeter (0.022 inch), "e" is 1.27 mm (0.050 in.), "f" is 1.62 mm (0.064 in.), "g" is 0.20 mm (0.008 in.) and the ratio of "d" to "b" is 0.63. A deflection member constructed to this geometry has an open area of about 69%.

This description was submitted to Laserworks and was used to program a computer-controlled laser engraving device which drilled holes into four 30.5-cm square sections of the PETG plastic to simulate the fabric produced by Trokhan. An undrilled rim remained around the edges of each plastic square having a width of 1.3 cm. The edges of the plastic squares were trimmed from 1.3 cm to 2 mm and then beveled at a 45 degree angle. A coarse polyester thread was used to sew a laser-drilled sheet onto an Asten 920 through drying fabric (AstenJohnson Corp., Appleton, Wis.), with the thread passing through laser-drilled holes near the rim of the plastic sheet and passing into the weave of the Asten 920 fabric. The laser-drilled sheet was sewn onto the "chute side" (the backside having dominant cross-direction chutes) of the TAD fabric. The TAD fabric was placed in a pilot paper machine with a through dryer, with the fabric inverted such that the chute side would be the paper contacting side. (The front side, with dominant warps, is normally the paper-contacting side of the fabric for commercial operation.)

The pilot paper machine was operated in a configuration for production of uncreped through-air dried tissue. The machine had a width of 22 inches and comprised a flow spreader which deposited an aqueous slurry at about 0.2% consistency onto a forming wire traveling at about 50 feet per minute, at a flow rate sufficient to product tissue having a basis weight of 40 grams per square meter, produced from 100% bleached kraft northern softwood (LL-19 from Kimberly-Clark Corp.) with 16 pounds per ton of Parez NC 631 added, a strength additive produced by Hercules, Inc. (Wilmington, Del.). The forming section had a vacuum box and foils for dewatering the web to a consistency of about 12%, followed by a transfer section in which the embryonic web was transferred from the forming fabric onto a second fine carrier fabric, wherein a vacuum shoe assisted the transfer. The web was transferred from the carrier fabric onto the sanded Asten 920 TAD fabric backed by a curved vacuum shoe to assist in transfer, wherein the TAD fabric was moving at a velocity 10% slower than the velocity of the carrier fabric to impart foreshortening to the web ("rush transfer"). After the rush transfer operation, the web passed through a Valmet through dryer operating at a hood temperature of about 300° F. to further dry the web to a consistency of about 95%. The web was removed from the TAD fabric after through drying and wound onto a reel without creping to produce an uncreped web.

With only one section of the laser-drilled plastic sewn onto the TAD fabric, only one short section of tissue was molded by the laser-drilled plastic for each complete revolution of the TAD fabric. While the laser-drilled fabric did permit molding of the tissue web, the bulk of the molded section was generally less than bulk of the tissue through-dried against the sanded Asten 920 fabric. Without wishing to be bound by theory, it is believed that the lower bulk imparted by the Trokhan fabric was at least partly because the flow resistance of the two layers of fabric, the Asten 920 fabric and the added laser-drilled fabric, hindered the effect of the air pressure differential during rush transfer and through drying such that that molding was not as thorough as it could have been were the base fabric (the Asten 920) not present. Nevertheless, the trial did demonstrate that a laser-drilled fabric simulating a deflection member could be used as a molding substrate in an uncreped through dried operation. In principle, little difficulty should be encountered in further modifying the uncreped through-drying system to serve as a creped through-drying system, in which the laser-drilled substrate would also serve as an imprinting surface for pressing the tissue against a Yankee dryer prior to creping or against another drying surface such as a heated roll or drum.

Example 2

23-gsm handsheets of LL-19 bleached kraft northern softwood pulp were prepared having a consistency of about 30%. The handsheets were placed over the laser-drilled plastic of Example 1 and subjected to a vacuum pressure of about 10 in Hg for 5 seconds to 30 seconds to cause molding. The sheets were removed, dried, and conditioned for 4 hours under Tappi standard conditions. Bulk was measured at a load of 220 grams per square inch under a platen having a diameter of 4 1/16 inches. Bulk values ranged from about 5 to about 7 grams per cubic centimeter. The texture of the fabric was visible on the molded handsheets, demonstrating that the laser-drilled substrate could be used for web molding.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

We claim:

1. A deflection member for imparting texture to a fibrous web comprising a base fabric and interconnected raised elements joined to the base fabric with deflection conduits between the raised elements, the raised elements having an asymmetrical cross-sectional profile in at least one of a machine direction and a cross direction and at least one nonlinear side relative to the vertical axis.

2. The deflection member of claim 1, wherein the base fabric is woven.

3. The deflection member of claim 1, wherein the base fabric is woven.

4. The deflection member of claim 1, wherein the raised elements comprise a radiation-cured resin.

5. The deflection member of claim 4, wherein the raised elements comprise a photocured resin.

6. The deflection member of claim 5, wherein the raised elements comprise a photocured resin cured by application of laser light.

7. The deflection member of claim 5, wherein the raised elements comprise a photocured resin cured by application of actinic radiation.

8. The deflection member of claim 5, wherein the raised elements do not comprise a photocured resin cured by application of actinic radiation.

9. The deflection member of claim 5, wherein the raised elements comprise a photocured resin cured by application of visible light.

10. The deflection member of claim 5, wherein the raised elements comprise a photocured resin cured by application of visible light having a wavelength at peak intensity of about 400 nm or greater.

11. The deflection member of claim 5, wherein the raised elements comprise a photocured resin cured by application of visible light having a wavelength at peak intensity of about 500 nm or greater.

12. The deflection member of claim 5, wherein the raised elements comprise a photocured resin cured by application of radiation applied from at least two different angles, such that the raised elements do not have straight, parallel sides when viewed in a cross-section taken in the machine direction.

13. The deflection member of claim 5, wherein the raised elements comprise a photocured resin cured by application of radiation applied in at least two steps through at least two different masks.

14. The deflection member of claim 5, wherein the raised elements comprise a photocured resin comprising a three-component photoinitiator system.

15. The deflection member of claim 5, wherein the raised elements comprise a polyimide resin.

16. The deflection member of claim 5, wherein the raised elements comprise an elastomer.

17. The deflection member of claim 5, wherein the raised elements comprise two or more dissimilar materials.

18. The deflection member of claim 17, wherein the raised elements comprise a composite having two or more material zones comprising dissimilar materials.

19. The deflection member of claim 1, wherein the raised elements do not comprise a photocured resin.

20. The deflection member of claim 1, wherein the raised elements comprise at least one of a thermoplastic, an epoxy, a polyurethane, a foam, sintered particles, or a polymer crosslinked without the need for actinic radiation.

21. The deflection member of claim 1, wherein the base fabric is formed from at least one integral layer of a material, wherein apertures in the base fabric are formed by at least one of laser drilling, machine tooling, thermal molding, chemical etching, application of radiofrequency energy, and application of ultrasonic energy.

22. The deflection member of claim 1, wherein the raised elements have an asymmetrical cross-sectional profile in both the machine direction and the cross direction.

23. The deflection member of claim 1, wherein the deflection member is impermeable to water.

24. The deflection member of claim 1, wherein the deflection member is permeable to water.

25. The deflection member of claim 1, further comprising a repeating pattern of spaced apart, discrete raised elements.

26. The deflection member of claim 1, further comprising a repeating pattern including a continuous network pattern of raised elements.

27. The deflection member of claim 1, wherein the raised elements have a top portion and a base portion, wherein the top portion is wider than the base portion.

28. The deflection member of claim 1, wherein the raised elements comprise a top portion and a base portion, wherein the top portion is narrower than the base portion.

29. The deflection member of claim 1, wherein the raised elements have a flat upper surface.

30. The deflection member of claim 1, wherein the raised elements have a curved surface.

31. The deflection member of claim 1, wherein the raised elements have a sloped upper surface.

32. The deflection member of claim 1, wherein the raised elements have an upper surface having an indentation.

33. The deflection member of claim 1, wherein the deflection member further comprises synclines.

34. The deflection member of claim 1, wherein the deflection member further comprises anti-synclines.

35. A deflection member for imparting texture to a fibrous web comprising a woven base fabric and interconnected raised elements joined to base fabric, the raised elements defining deflection conduits and having a top portion and a base portion, the top portion being wider than the base portion.

36. A deflection member for imparting texture to a fibrous web comprising interconnected raised elements and deflection conduits, the raised elements having an asymmetrical cross-sectional profile and each of the raised elements comprising a composite having two or more dissimilar materials in discrete zones.

37. A deflection member for imparting texture to a fibrous web comprising interconnected raised elements and deflection conduits, the raised elements having a cross-sectional profile with a top portion and a base portion, the top portion being wider than the base portion.

38. The deflection member of claim 37, wherein the raised elements have a flat upper surface.

39. The deflection member of claim 37, wherein the raised elements have a curved upper surface.

40. The deflection member of claim 37, wherein the raised elements have a sloped upper surface.

41. The deflection member of claim 37, further comprising a base fabric connected to the raised elements.

42. The deflection member of claim 37, wherein the raised elements comprise a photocured resin.

43. The deflection member of claim 42, wherein the photocured resin was cured by application of visible light.

44. The deflection member of claim 42, wherein the photocured resin comprises a polyimide.

45. The deflection member of claim 37, wherein the raised elements do not comprise a photocured resin.

46. The deflection member of claim 37, wherein at least a portion of the deflection conduits were formed by a positive photoresist method.

47. The deflection member of claim 37, wherein the deflection member is impermeable to water.

48. The deflection member of claim 37, wherein the deflection member is permeable to water.

49. The deflection member of claim 37, further comprising a repeating pattern of spaced apart, discrete raised elements.

50. The deflection member of claim 37, further comprising a repeating pattern including a continuous network pattern of raised elements.

51. A deflection member for imparting a texture to a paper web comprising raised elements and deflection conduits, having at least one subset of the raised elements arranged in a repeating pattern, the raised elements of the subset comprising a heterogeneous composite of two or more materials differing in at least one material property selected from elastic modulus, storage modulus, and Poisson ratio, wherein each of the two or more elements is in a discrete zone of each of the raised elements.

52. The deflection member of claim 50, further comprising a base fabric connected to the raised elements.

53. The deflection member of claim 51, wherein at least one subset of the raised elements has a cross-sectional profile characterized by an asymmetrical shape.

54. The fabric of claim 51, wherein the two or more materials are asymmetrically distributed elements relative to at least one of a machine direction and cross direction profile.

55. A foraminous deflection member comprising a foraminous element and a framework, said framework comprising a microscopically monoplanar, patterned, continuous network surface defining within said member a plurality of discrete, isolated, deflection conduits, the framework comprising raised elements including a composite of two or more materials having material properties differing in at least one of elastic modulus, storage modulus, and Poisson ratio, wherein each of the two or more materials is in a discrete zone of each of the raised elements.

56. A foraminous deflection member comprising a foraminous element and a framework, said framework comprising a microscopically monoplanar, patterned, continuous network surface defining within said member a plurality of discrete, isolated, deflection conduits, wherein a cross-section of the framework in at least one of the machine direction and the cross direction of the deflection member exhibits raised elements having asymmetrical shapes with at least one nonlinear side relative to the vertical axis.

57. A deflection member comprising a base fabric, raised elements connected to the base fabric, and deflection conduits between the raised elements, the raised elements including two or more subsets of raised elements arranged in respective repeating patterns, the two or more subsets of raised elements differing in at least one of height and material composition, and the deflection conduits having a cross-sectional shape with an upper portion having a first mean width between one subset of raised elements and a lower portion having a second mean width between another subset of raised elements, with a step change in width occurring between the two portions.

58. The deflection member of claim 37, wherein said deflection member is at least about 0.35 millimeter thick.

59. The deflection member of claim 37, wherein the perimeter of a majority of the deflection conduits defines a polygon having fewer than seven sides and wherein the deflection conduits are distributed in a repeating array.

60. The deflection member of claim 1, wherein the deflection conduits are distributed in a repeating array.

61. The deflection member of claim 37, or 69 wherein the perimeter of a majority of the deflection conduits defines a closed figure having nonlinear sides and wherein the deflection conduits are distributed in a repeating array.

62. A method of making a foraminous papermaking fabric comprising:
   a) providing a base fabric;
   b) applying a visible-light photocurable resin to the base fabric
   c) applying non-actinic visible-light in a predetermined pattern to cure a portion of the resin;
   d) changing the angle of application of the visible light relative to the base fabric; and
   e) removing the uncured portion of the resin to reveal deflection conduits having asymmetrical profiles in the machine direction of the deflection member.

63. The method of claim 62, wherein the visible-light photocurable resin comprises a dye, a photoinitiator, and a monomer.

64. The method of claim 62, wherein the visible-light photocurable resin comprises a light absorbing compound, an electron donor, and an iodonium salt.

65. The method of claim 62, wherein removing, the uncured portion of the resin comprises washing the fabric with a liquid.

66. The method of claim 62, wherein the foraminous fabric comprises deflection conduits corresponding to the uncured portion of the resin.

67. The method of claim 62, wherein applying non-actinic visible-light comprises scanning the resin with a visible-light laser beam.

68. The method of claim 62, wherein the non-actinic visible-light has a spectrum with at least 90% of the applied energy corresponding to wavelengths above 400 nanometers.

69. The method of claim 57, wherein the non-actinic visible-light has a spectrum with substantially all of the applied energy corresponding to wavelengths above 400 nanometers.

70. The papermaking fabric made according to claim 62.

71. A method of making a foraminous deflection member comprising:
   a) providing a foraminous base fabric having an upper surface and a lower surface;
   b) applying a radiation-curable resin to the base fabric to form a layer of resin above the upper surface of the base fabric;
   c) applying radiation in a first pattern to cure a first portion of the resin;
   d) applying radiation in a second pattern to cure a second portion of the resin; and
   e) removing the uncured portion of the resin to reveal deflection conduits having an asymmetrical profile in the machine direction of the deflection member.

72. The method of claim 71, wherein the radiation applied in the first pattern is applied from below the base fabric, and the radiation applied in the second pattern is applied from above the base fabric.

73. The method of claim 71, wherein the radiation applied in the first pattern is has a different wavelength than the radiation applied in the second pattern.

74. A method of making a foraminous deflection member comprising:
   a) providing a foraminous base fabric having an upper surface and a lower surface;
   b) applying a radiation-curable resin to the base fabric to form a layer of resin having an upper surface above the upper surface of the base fabric;
   c) applying radiation at a first angle relative to the base fabric to cure a first portion of the resin;
   d) applying radiation at a second angle relative to the base fabric to cure a second portion of the resin; and
   e) removing the uncured portion of the resin to reveal deflection conduits having an asymmetrical profile in the machine direction of the deflection member.

* * * * *

UNITED STATES PATENT AND TRADEMARK OFFICE
CERTIFICATE OF CORRECTION

PATENT NO. : 6,660,362 B1
DATED : December 9, 2003
INVENTOR(S) : Lindsay et al.

It is certified that error appears in the above-identified patent and that said Letters Patent is hereby corrected as shown below:

Column 44,
Line 2, after "asymmetrically distributed" insert -- in the raised --;
Lines 5-14, cancel Claim 55, beginning with "55. A foraminous deflection member" through and including "the raised elements." and insert the following claim:

-- 55. A foraminous deflection member comprising a foraminous element and a framework, said framework comprising a macroscopically monoplanar, patterned, continuous network surface defining within said member a plurality of discrete, isolated, deflection conduits, the framework comprising raised elements including a composite of two or more materials having material properties differing in at least one of elastic modulus, storage modulus, and Poisson ratio, wherein each of the two or more materials is in a discrete zone of each of the raised elements and the framework including the two or more dissimilar materials in the discrete zones in a cross-sectional profile at any point of the framework. -- ;

Lines 15-23, cancel claim 56, beginning with "56. A foraminous deflection member" through and including "to the vertical axis." and insert the following claim:

-- 56. A foraminous deflection member comprising a foraminous element and a framework, said framework comprising a macroscopically monoplanar, patterned, continuous network surface defining within said member a plurality of discrete, isolated, deflection conduits, wherein a cross-section of the framework in at least one of the machine direction and the cross direction of the deflection member exhibits raised elements having asymmetrical shapes with at least one nonlinear side in a cross-sectional plane perpendicular to the base fabric. -- ;

Lines 36 and 38, replace "37" with -- 1 or 37 --;
Line 44, replace "37, or 69" with -- 1 or 37 --;
Lines 48-59, cancel Claim 62, beginning with "62. A method of making" through and including "the deflection member." and insert the following claim:

-- 62. A method of making a foraminous papermaking fabric comprising:
  a) providing a base fabric;
  b) applying a visible-light photocurable resin to the base fabric
  c) applying non-actinic visible-light in a predetermined pattern to cure a portion of the resin;
  d) changing the angle of application of the visible light relative to the base fabric; and
  e) removing the uncured portion of the resin to reveal deflection conduits having an asymmetrical profile in a profile plane perpendicular to the base fabric and including at least one nonlinear side in the profile plane. -- ;

UNITED STATES PATENT AND TRADEMARK OFFICE
CERTIFICATE OF CORRECTION

PATENT NO.    : 6,660,362 B1
DATED         : December 9, 2003
INVENTOR(S)   : Lindsay et al.

It is certified that error appears in the above-identified patent and that said Letters Patent is hereby corrected as shown below:

Column 44, cont'd.,
Line 66, remove the second occurrence of ","

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,660,362 B1                                    Page 1 of 3
DATED         : December 9, 2003
INVENTOR(S)   : Lindsay et al.

It is certified that error appears in the above-identified patent and that said Letters Patent is hereby corrected as shown below:

Column 41,
Lines 44-50, cancel Claim 1, beginning with "1. A deflection member" through and including "the vertical axis." and insert the following claim:

-- 1. A deflection member for imparting texture to a fibrous web comprising a base fabric and interconnected raised elements joined to the base fabric with deflection conduits between the raised elements, the raised elements having an asymmetrical cross-sectional profile in a profile plane perpendicular to the base fabric and including at least one nonlinear side in the profile plane. -- ;

Line 54, insert -- not -- before "woven."
Lines 15-20, cancel claim 36, beginning with "36. A deflection member" through and including "in discrete zones." and insert the following claim:

-- 36. A deflection member for imparting texture to a fibrous web comprising a continuous framework of interconnected raised elements and deflection conduits, the raised elements having an asymmetrical cross-sectional profile and each of the raised elements comprising a composite having two or more dissimilar materials in discrete zones, wherein the framework of interconnected raised elements includes the two or more dissimilar materials in the discrete zones in a cross-sectional profile at any point of the framework. -- ;

Lines 55-63, cancel Claim 51, beginning with "51. A deflection member" through and including "the raised elements." and insert the following claim:

-- 51. A deflection member for imparting a texture to a paper web comprising a continuous framework of raised elements and deflection conduits, having at least one subset of the raised elements arranged in a repeating pattern, the raised elements of the subset comprising a heterogeneous composite of two or more materials differing in at least one material property selected from elastic modulus, storage modulus, and Poisson ratio, wherein each of the two or more materials is in a discrete zone of each of the raised elements, wherein the framework of raised elements includes the two or more dissimilar materials in the discrete zones in a cross-sectional profile of the subset at any point of the framework. -- ;

Line 64, replace "50" with -- 51 --

Column 44,
Line 2, after "asymmetrically distributed" insert -- in the raised --;
Lines 5-14, cancel Claim 55, beginning with "55. A foraminous deflection member" through and including "the raised elements." and insert the following claim:

-- 55. A foraminous deflection member comprising a foraminous element and a framework, said framework comprising a macroscopically monoplanar, patterned, continuous network surface defining within said member a plurality of discrete, isolated, deflection conduits, the framework comprising raised elements including a composite of two or more materials having material properties differing in at least one of elastic modulus, storage modulus, and Poisson ratio, wherein each of the two or more materials is in a discrete zone of each of the raised elements and the framework including the two or more dissimilar materials in the discrete zones in a cross-sectional profile at any point of the framework. -- ;

UNITED STATES PATENT AND TRADEMARK OFFICE
CERTIFICATE OF CORRECTION

PATENT NO. : 6,660,362 B1
DATED : December 9, 2003
INVENTOR(S) : Lindsay et al.

It is certified that error appears in the above-identified patent and that said Letters Patent is hereby corrected as shown below:

<u>Column 44 (cont'd),</u>
Lines 15-23, cancel claim 56, beginning with "56. A foraminous deflection member" through and including "to the vertical axis." and insert the following claim:

-- 56. A foraminous deflection member comprising a foraminous element and a framework, said framework comprising a macroscopically monoplanar, patterned, continuous network surface defining within said member a plurality of discrete, isolated, deflection conduits, wherein a cross-section of the framework in at least one of the machine direction and the cross direction of the deflection member exhibits raised elements having asymmetrical shapes with at least one nonlinear side in a cross-sectional plane perpendicular to the base fabric. -- ;

Lines 36 and 38, replace "37" with -- 1 or 37 --;
Line 44, replace "37, or 69" with -- 1 or 37 --;
Lines 48-59, cancel Claim 62, beginning with "62. A method of making" through and including "the deflection member." and insert the following claim:

-- 62. A method of making a foraminous papermaking fabric comprising:
    a) providing a base fabric;
    b) applying a visible-light photocurable resin to the base fabric
    c) applying non-actinic visible-light in a predetermined pattern to cure a portion of the resin;
    d) changing the angle of application of the visible light relative to the base fabric; and
    e) removing the uncured portion of the resin to reveal deflection conduits having an asymmetrical profile in a profile plane perpendicular to the base fabric and including at least one nonlinear side in the profile plane. -- ;

Line 66, remove the second occurrence of ","

<u>Column 45,</u>
Line 11, replace "57" with -- 68 --;
Line 16, cancel claim 71, beginning with "71. A method of making" and including "the deflection member."

<u>Column 46,</u>
Line 3, and insert the following claim:

-- 71. A method of making a foraminous deflection member comprising:
    a) providing a foraminous base fabric having an upper surface and a lower surface;
    b) applying a radiation-curable resin to the base fabric to form a layer of resin above the upper surface of the base fabric;
    c) applying radiation in a first pattern to cure a first portion of the resin;
    d) applying radiation in a second pattern to cure a second portion of the resin; and
    e) removing the uncured portion of the resin to reveal deflection conduits having an asymmetrical profile in a profile plane perpendicular to the base fabric and including at least one nonlinear side in the profile plane. --

UNITED STATES PATENT AND TRADEMARK OFFICE
CERTIFICATE OF CORRECTION

PATENT NO. : 6,660,362 B1
DATED : December 9, 2003
INVENTOR(S) : Lindsay et al.

It is certified that error appears in the above-identified patent and that said Letters Patent is hereby corrected as shown below:

Column 46 (cont'd),
Line 11, cancel claim 74, beginning with "74. A method of making" through and including "the deflection member."
Line 24, and insert the following claim:

-- 74. A method of making a foraminous deflection member comprising:
    a) providing a foraminous base fabric having an upper surface and a lower surface;
    b) applying a radiation-curable resin to the base fabric to form a layer of resin having an upper surface above the upper surface of the base fabric;
    c) applying radiation at a first angle relative to the base fabric to cure a first portion of the resin;
    d) applying radiation at a second angle relative to the base fabric to cure a second portion of the resin; and
    e) removing the uncured portion of the resin to reveal deflection conduits having an asymmetrical profile in a profile plane perpendicular to the base fabric and including at least one nonlinear side in the profile plane. --

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,660,362 B1
DATED : December 9, 2003
INVENTOR(S) : Lindsay et al.

It is certified that error appears in the above-identified patent and that said Letters Patent is hereby corrected as shown below:

Column 41,
Line 44, cancel Claim 1, beginning with "1. A deflection member" through and including "the vertical axis.
Line 50, insert the following claim:
-- 1. A deflection member for imparting texture to a fibrous web comprising a base interconnected raised elements joined to the base fabric with deflection conduits between the raised elements, the raised elements having an asymmetrical cross-sectional profile in a profile plane perpendicular to the base fabric and including at least one nonlinear side in the profile plane. --;
Line 54, insert -- not -- before "woven."

Column 42,
Line 67, insert -- upper -- after "curved"

Column 43,
Line 15, cancel Claim 36, beginning with "36. A deflection member" through and including "in discrete zones."
Line 20, insert the following claim:
-- 36. A deflection member for imparting texture to a fiborous web comprising a continuous framework of interconneted raised elements and deflection conduits, the raised elements having an asymmetrical cross-sectional profile and each of the raised elements comprising a composite having two or more dissimilar materials in discrete zones, wherein the framework of interconnectd raised elements includes the two or more dissimilar materials in the discrete zones in a cross-sectional profile at any point of the framework. --;
Line 55, cancel Claim 51, beginning with "51. A deflection member" through and including "the raised elements."
Line 63, insert the following claim:
-- 51. A deflection member for imparting a texture to a paper web comprising a continuous framework of raised elements and deflection conduits, having at least one subset of the raised elements arranged in a repeating pattern, the raised elements of the subset comprising a heterogeneous composite of two or more materials differing in at least one material property selected from elastic modules, storage modulus, and Poisson ratio, wherein each of the two or more materials is in a discrete zone of each of the raised elements, wherein the framework of raised elements includes the two or more dissimilar materials in the discrete zones in a cross-sectional profile of the subset at any point of the framework. --;
Line 64, replace "50" with -- 51 --

UNITED STATES PATENT AND TRADEMARK OFFICE
CERTIFICATE OF CORRECTION

PATENT NO. : 6,660,362 B1
DATED : December 9, 2003
INVENTOR(S) : Lindsay et al.

It is certified that error appears in the above-identified patent and that said Letters Patent is hereby corrected as shown below:

Column 44,
Line 2, after "asymmetrically distributed" insert -- in the raised --;
Lines 5-14, cancel Claim 55, beginning with "55. A foraminous deflection member" through and including "the raised elements." and insert the following claim:

-- 55. A foraminous deflection member comprising a foraminous element and a framework, said framework comprising a macroscopically monoplanar, patterned, continuous network surface defining within said member a plurality of discrete, isolated, deflection conduits, the framework comprising raised elements including a composite of two or more materials having material properties differing in at least one of elastic modulus, storage modulus, and Poisson ratio, wherein each of the two or more materials is in a discrete zone of each of the raised elements and the framework including the two or more dissimilar materials in the discrete zones in a cross-sectional profile at any point of the framework. -- ;

Lines 15-23, cancel claim 56, beginning with "56. A foraminous deflection member" through and including "to the vertical axis." and insert the following claim:

-- 56. A foraminous deflection member comprising a foraminous element and a framework, said framework comprising a macroscopically monoplanar, patterned, continuous network surface defining within said member a plurality of discrete, isolated, deflection conduits, wherein a cross-section of the framework in at least one of the machine direction and the cross direction of the deflection member exhibits raised elements having asymmetrical shapes with at least one nonlinear side in a cross-sectional plane perpendicular to the base fabric. -- ;

Lines 36 and 38, replace "37" with -- 1 or 37 --;
Line 44, replace "37, or 69" with -- 1 or 37 --;
Lines 48-59, cancel Claim 62, beginning with "62. A method of making" through and including "the deflection member." and insert the following claim:

-- 62. A method of making a foraminous papermaking fabric comprising:
    a) providing a base fabric;
    b) applying a visible-light photocurable resin to the base fabric
    c) applying non-actinic visible-light in a predetermined pattern to cure a portion of the resin;
    d) changing the angle of application of the visible light relative to the base fabric; and
    e) removing the uncured portion of the resin to reveal deflection conduits having an asymmetrical profile in a profile plane perpendicular to the base fabric and including at least one nonlinear side in the profile plane. -- ;

UNITED STATES PATENT AND TRADEMARK OFFICE
CERTIFICATE OF CORRECTION

PATENT NO.   : 6,660,362 B1
DATED        : December 9, 2003
INVENTOR(S)  : Lindsay et al.

It is certified that error appears in the above-identified patent and that said Letters Patent is hereby corrected as shown below:

Column 44, cont'd.,
Line 66, remove the second occurrence of ","

This certificate supersedes Certificate of Correction issued June 29, 2004.

Signed and Sealed this

Nineteenth Day of July, 2005

JON W. DUDAS
*Director of the United States Patent and Trademark Office*